US009342380B2

(12) United States Patent
Dice et al.

(10) Patent No.: US 9,342,380 B2
(45) Date of Patent: May 17, 2016

(54) SYSTEM AND METHOD FOR IMPLEMENTING READER-WRITER LOCKS USING HARDWARE TRANSACTIONAL MEMORY

(71) Applicant: Oracle International Corporation, Redwood City, CA (US)

(72) Inventors: David Dice, Foxboro, MA (US); Yosef Lev, New York, NY (US); Yujie Liu, Bethlehem, PA (US); Victor M. Luchangco, Cambridge, MA (US); Mark S. Moir, Wellington (NZ)

(73) Assignee: Oracle International Corporation, Redwood City, CA (US)

( * ) Notice: Subject to any disclaimer, the term of this patent is extended or adjusted under 35 U.S.C. 154(b) by 388 days.

(21) Appl. No.: 13/784,965

(22) Filed: Mar. 5, 2013

(65) Prior Publication Data

US 2014/0258645 A1    Sep. 11, 2014

(51) Int. Cl.
*G06F 12/00* (2006.01)
*G06F 9/52* (2006.01)
*G06F 9/46* (2006.01)

(52) U.S. Cl.
CPC ............... *G06F 9/528* (2013.01); *G06F 9/467* (2013.01); *G06F 2209/523* (2013.01)

(58) Field of Classification Search
None
See application file for complete search history.

(56) References Cited

U.S. PATENT DOCUMENTS

| 2007/0067774 | A1* | 3/2007 | Kukanov et al. | 718/102 |
| 2010/0275209 | A1* | 10/2010 | Detlefs | 718/102 |
| 2012/0124563 | A1* | 5/2012 | Chung | G06F 9/467 717/140 |

OTHER PUBLICATIONS

Dave Dice, et al "Early Experience with a Commercial Hardware Transactional Memory Implementation" Sun Microsystems ASPLOS'09 Mar. 7-11, 2009, pp. 1-12.

Dave Dice, et al "Simplifying Concurrent Algorithms by Exploiting Hardware Transactional Memory" SPAA'10 Jun. 13-15, 2010, pp. 1-10.

Dave Dice, et al "Technical Report—Early Experience with a Commercial Hardware Transactional Memory Implementation" Sun Microsystems Laboratories Oct. 2009 pp. 1-60.

David Dice, et al "Applications of the Adaptive Transactional Memory Test Platform" Sun Microsystems 2008, pp. 1-10, Dec. 2008.

Aleksandar Dragojevic, et al "STM in the Small: Trading Generality for Performance in Software Transactional Memory" EuroSys'12 Apr. 10-13, 2012 pp. 1-14.

(Continued)

*Primary Examiner* — Baboucarr Faal
(74) *Attorney, Agent, or Firm* — Robert C. Kowert; Meyertons, Hood, Kivlin, Kowert & Goetzel, P.C.

(57) ABSTRACT

Transactional reader-writer locks may leverage available hardware transactional memory (HTM) to simplify the procedures of the reader-writer lock algorithm and to eliminate a requirement for type stable memory An HTM-based reader-writer lock may include an ordered list of client-provided nodes, each of which represents a thread that holds (or desires to acquire) the lock, and a tail pointer. The locking and unlocking procedures invoked by readers and writers may access the tail pointer or particular ones of the nodes in the list using various combinations of transactions and non-transactional accesses to insert nodes into the list or to remove nodes from the list. A reader or writer that owns a node at the head of the list (or a reader whose node is preceded in the list only by other readers' nodes) may access a critical section of code or shared resource.

20 Claims, 19 Drawing Sheets

(56) References Cited

OTHER PUBLICATIONS

Michael Greenwald, et al "The Synergy Between Non-blocking Synchronization and Operating System Structure" USENIX Association OSDI '96, pp. 1-14, Dec. 1996.
John M. Mellor-Crummey, et al "Algorithms for Scalable Synchronization on Shared-Memory Multiprocessors" Jan. 1991, pp. 1-42.
Orran Krieger, et al "A Fair Fast Scalable Reader-Writer Lock" Proc. Intl. Conf. on Parallel Processing, 1993, pp. 1-4, Dec. 1993.
Ravi Rajwar et al "Speculative Lock Elision: Enabling Highly Concurrent Multithreaded Execution" 34th MICRO Dec. 3-5, 2001, pp. 1-12.
Yossi Lev et al "Scalable Reader-Writer Locks" SPAA '09 Aug. 11-13, 2009 Sun Microsystems pp. 1-10.

* cited by examiner

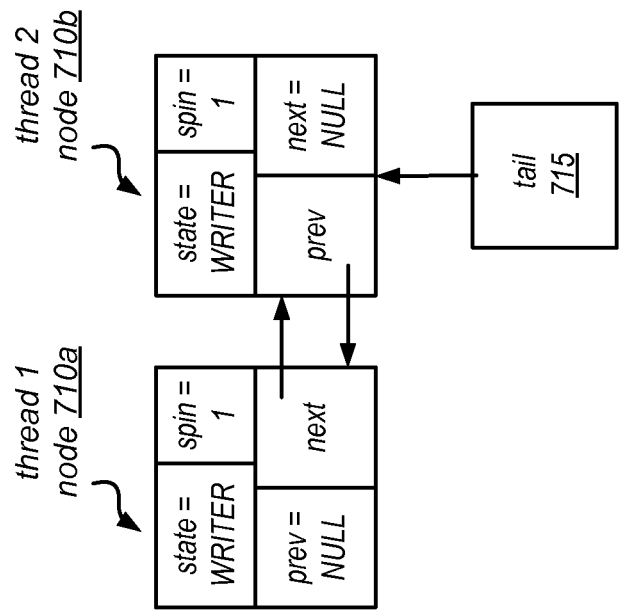
FIG. 7C
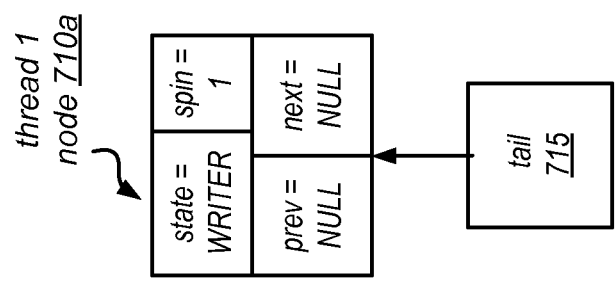
FIG. 7B
FIG. 7A

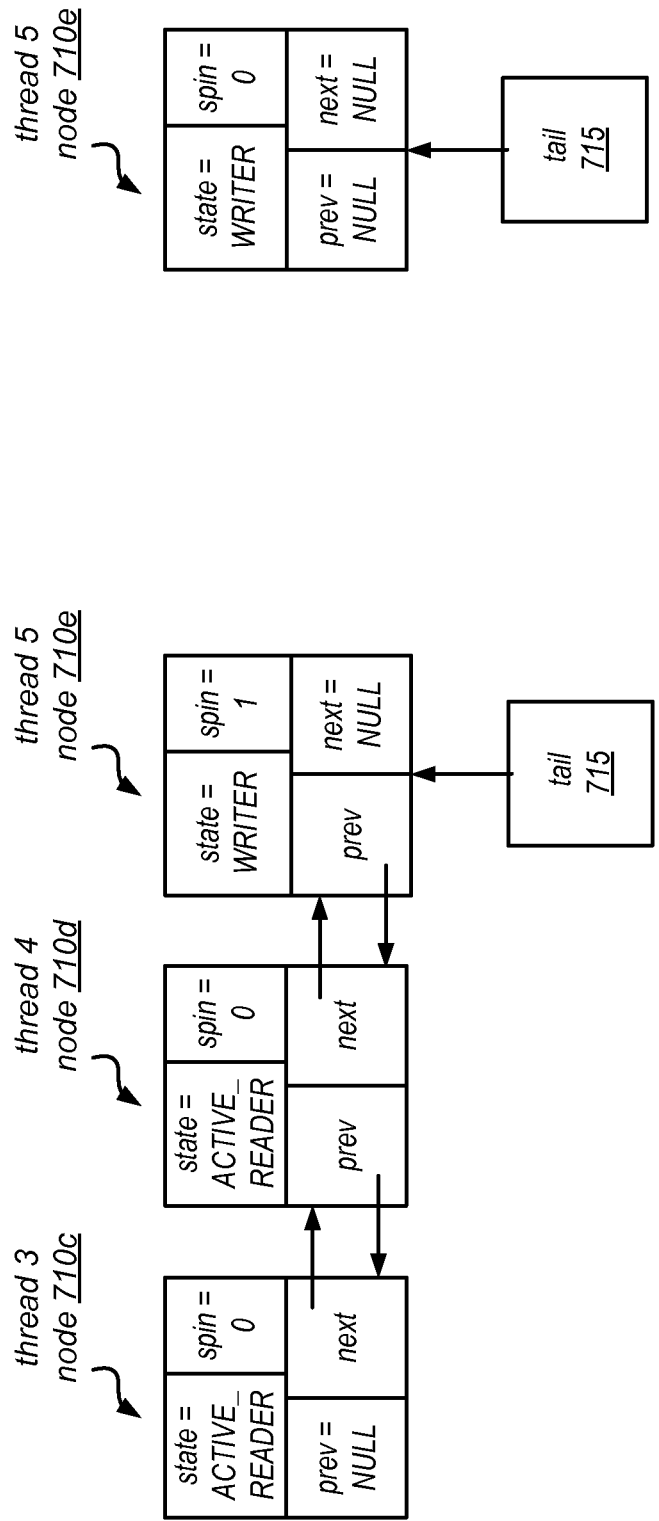

SYSTEM AND METHOD FOR IMPLEMENTING READER-WRITER LOCKS USING HARDWARE TRANSACTIONAL MEMORY

BACKGROUND

1. Field of the Disclosure

This disclosure relates generally to reader-writer locks, and more particularly to systems and methods for implementing reader-writer locks that take advantage of available hardware transactional memory.

2. Description of the Related Art

In a multiprocessor environment, threads can participate in a mutual exclusion protocol through the use of lock or "mutex" constructs. A mutual exclusion lock can either be in a locked state or an unlocked state, and only one thread can hold or own the lock at any given time. The thread that owns the lock is permitted to enter a critical section of code protected by the lock or otherwise access a shared resource protected by the lock. If a second thread attempts to obtain ownership of a lock while the lock is held by a first thread, the second thread will not be permitted to proceed into the critical section of code (or access the shared resource) until the first thread releases the lock and the second thread successfully claims ownership of the lock.

A list-based queue type lock described by J. M. Mellor-Crummy and M. L. Scott (which is sometimes referred to as the MCS lock) maintains an ordered list of client-provided nodes, which includes one node for each thread that is in the critical section or is waiting to enter. In this mutual exclusion lock algorithm, when invoking a lock procedure, a given thread must pass to the lock procedure an indicator (e.g., a pointer) to a node that is not already being used by any thread (including by the given thread for a different lock), and when invoking an unlock procedure, the thread must pass to the unlock procedure an indicator of the same node that it passed to the corresponding lock procedure. The thread is said to "own" the indicated node from the time the given thread invokes the lock procedure until the thread returns from the corresponding unlock procedure. If a thread inserts its node into an empty list, the thread enters the critical section; otherwise, the thread waits until its node is at the head of the list (i.e., until it is the first node in the list). When leaving the critical section, the thread releases the lock by invoking an unlock procedure that removes its node from the list. Thus, a thread in the critical section always owns the first node in the list.

Reader-writer locks are an important category of locks that help programmers overcome the scalability issues that are common with traditional mutual exclusion locks for workloads that include a significant percentage of read-only critical sections of code. At any given time, a reader-writer lock allows one or more reader threads to own a lock in a read-only mode or just one writer thread to own the lock in a write mode. With reader-writer locks, this permission persists until it is explicitly surrendered using an unlock operation.

As with the MCS lock, a reader-writer lock algorithm described by O. Krieger, M. Stumm, R. Unrau, and J. Hanna (which is referred to herein as the KSUH algorithm) also maintains a queue (e.g., a doubly-linked list) of client-provided nodes (one for each thread that is in the critical section or is waiting to enter it). The KSUH algorithm supports acquiring a reader-writer lock in a read-only mode or in a write mode, and allows a reader thread to enter a critical section provided that all of the nodes ahead of its node in the list are also owned by reader threads. Because readers might not exit the critical section in the same order in which they entered the critical section, the KSUH algorithm allows the removal of nodes owned by readers from within the list. Because nodes can be modified an arbitrarily long time after they have been removed from the list, in the KSUH algorithm, if the memory used for a node has since been reallocated for another purpose, such late updates can lead to arbitrary behavior. Thus, the KSUH algorithm requires clients to store nodes in Type Stable Memory (TSM) and/or to ensure that they are never deallocated or reused for a different purpose.

SUMMARY

The system and methods described herein may in some embodiments implement transactional reader-writer locks that leverage available hardware transactional memory (HTM) to simplify the procedures of the reader-writer lock algorithm and to eliminate a requirement for type stable memory. In some embodiments, an HTM-based reader-writer lock may include an ordered list of client-provided nodes, each of which represents (and is owned by) a thread that holds (or desires to acquire) the lock, and an associated tail pointer. The HTM-based lock may protect (or control access to) a critical section of code or a shared resource. A thread of an application that wishes to acquire the lock (for reading or writing) may invoke a locking procedure to insert a new node in the list of nodes. A reader thread or writer thread that owns a node at the head of the list (or a reader thread whose node is preceded in the list only by one or more other readers' nodes) may access the critical section of code or shared resource that is protected by the lock. A thread that wishes to release the lock (e.g., after exiting the critical section or when it no longer requires access to the shared resource) may invoke an unlocking procedure that removes its node from the list.

In various embodiments, the locking and unlocking procedures invoked by reader threads and by writer threads may access the tail pointer or particular ones of the nodes in the list using different combinations of transactions and non-transactional accesses to insert nodes into the list and/or to remove nodes from the list. For example, inserting a node in the list may include updating the value of the associated tail pointer to indicate that the new node is the last node in the list, and may also include linking the new node to a predecessor node in the list (if any exists) by updating the values of a prev field in the new node and a next field in the predecessor node, some of which may be performed within a transaction. In some embodiments, prior to updating the value of the tail pointer to indicate that the new node is the last node in the list, the thread may update the value of the tail pointer to a pre-determined special value using a non-transactional atomic write operation, indicating an intent to acquire the lock.

In various embodiments, removing a node from the list may include updating the value of the tail pointer and/or unlinking the node from its successor or predecessor node(s) in the list by updating the next and/or prev fields of these nodes to splice the removed node out of the ordered list of nodes. Again, some of these updates may be performed within a transaction, in different embodiments. In some embodiments, after a node is removed from the list, the application may free the memory that was allocated to the node back to the operating system.

BRIEF DESCRIPTION OF THE DRAWINGS

FIGS. 7A-7K are block diagrams illustrating the use of the reader-writer locks described herein, according to one embodiment.

Figure 1:
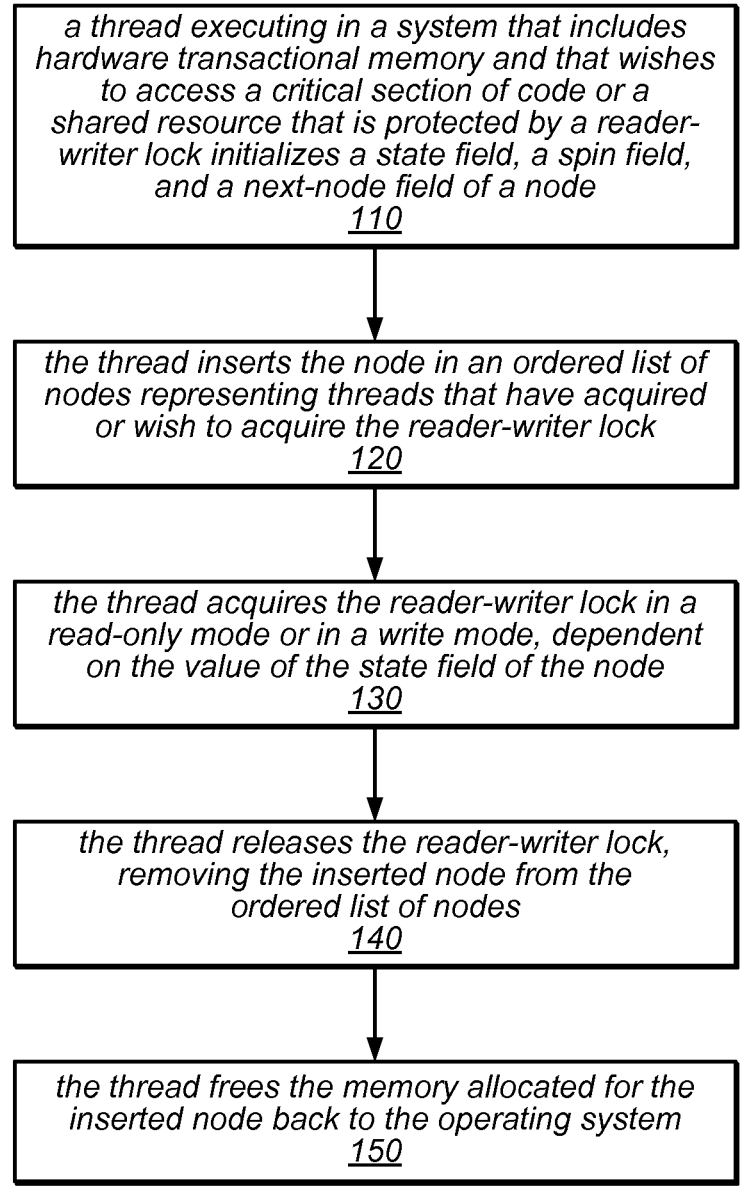
FIG. 1 is a flow diagram illustrating one embodiment of a method for implementing reader-writer locks using hardware transactional memory, as described herein.

While the disclosure is described herein by way of example for several embodiments and illustrative drawings, those skilled in the art will recognize that the disclosure is not limited to embodiments or drawings described. It should be understood that the drawings and detailed description hereto are not intended to limit the disclosure to the particular form disclosed, but on the contrary, the disclosure is to cover all modifications, equivalents and alternatives falling within the spirit and scope as defined by the appended claims. Any headings used herein are for organizational purposes only and are not meant to limit the scope of the description or the claims. As used herein, the word "may" is used in a permissive sense (i.e., meaning having the potential to) rather than the mandatory sense (i.e. meaning must). Similarly, the words "include", "including", and "includes" mean including, but not limited to.

DETAILED DESCRIPTION OF EMBODIMENTS

The systems and methods described herein may be used to implement reader-writer locks that take advantage of available hardware transactional memory (HTM). For example, the methods used to acquire and/or release one of these reader-writer locks may update various fields of the nodes that collectively represent the lock using a hardware transaction or may update other shared variables associated with the lock (e.g., a tail pointer) using a hardware transaction. These HTM-based reader-writer locks and the methods used to acquire and release them may be significantly simpler to implement than those of previous reader-writer lock algorithms, and may eliminate usage constraints and reduce space requirements when compared to previous reader-writer locks and corresponding methods. In some embodiments, the performance of the HTM-based reader-writer lock algorithms described herein may be competitive with existing algorithms under typical conditions. In other embodiments, one or more optimizations may be applied to improve the performance of HTM-based reader-writer lock algorithms under heavy contention (e.g., when multiple threads wish to acquire a reader-writer lock in a write mode). In still other embodiments, one or more techniques may be applied to improve the progress properties of HTM-based reader-writer lock algorithms.

In general, transactional memory may be implemented in hardware, with the hardware transactional memory (HTM) directly ensuring that a transaction is atomic, or as software transactional memory (STM) that provides the "illusion" that a transaction is atomic, even though in fact it is executed in smaller atomic steps by underlying hardware. HTM solutions are generally faster than STM ones, but so-called "best-effort" HTM implementations may not be guaranteed to be able commit any particular transaction. Recently developed Hybrid Transactional Memory (HyTM) implementations may allow transactions to be executed using hardware transactional memory if it is available (and when it is effective), or using software transactional memory otherwise.

As noted above, reader-writer locks are a class of locks that permit simultaneous acquisition by more than one thread that intends to access the data protected by the locks in a read-only mode. The use of reader-writer locks may enable significantly greater concurrency (as compared to traditional mutual exclusion locks) between threads that acquire a reader-writer lock in a read-only mode, and may thus result in much better scalability than can be achieved using traditional mutual exclusion locks. As described in more detail herein, a reader-writer lock may be implemented as a collection of objects (or nodes) that controls access to a critical section of code or a shared resource by reader threads and writer threads using lock and unlock methods. The objects (nodes) may be implemented in shared memory, and may include various common safety and liveness properties.

In the KSUH lock algorithm described above, a Tail variable identifies the most recently added node, and if the next field of a node n is non-NULL, it identifies the node that immediately succeeds n in the ordered list of nodes. To enable departing readers to remove their nodes from within the list, each reader node is also linked to its predecessor in the list (if one exists) via a prev field, and a per-node lock is used for node removal. In the KSUH lock algorithm, each node also includes a state field, which contains a value of READER or WRITER when the node is added to the list, indicating the mode of the lock request, and a reader changes its state to ACTIVE READER before entering the critical section to allow its successor to follow it into the critical section. In this algorithm as well as in the HTM-based reader-writer lock algorithms described herein, a node that is owned by a given thread is a writer node if its state field value is WRITER; otherwise, it is a reader node. The node is an active-reader node if its state field value is ACTIVE READER. As in MCS, a given thread waits for its turn to enter the critical section by spinning on a spin field in its node, and another thread informs the given thread that it can enter the critical section by resetting this field.

In the KSUH algorithm, a node is inserted into the list by using a SWAP type operation to record the previous value of the Tail variable while simultaneously storing a pointer to the new node into Tail, and then linking the new node into the list by updating its prev field and updating the next field of its predecessor. The property that a reader can enter the critical section if all of the nodes before its node in the list belong to readers is approximated by propagating the information that the first reader in the list has entered the critical section down the list. For example, before entering the critical section, a reader releases its successor if it is a reader (e.g., by resetting the value of the successor's spin field), and then sets its own state to ACTIVE READER, indicating to a subsequently arriving reader that it does not need to wait before following it into the critical section.

In the KSUH lock algorithm, when a thread removes a node of a reader from within the list, it acquires the per-node locks of its predecessor node and its successor node (if they exist), updates the links in those nodes in order to splice its node out of the list, and releases its successor by resetting its spin field. A thread removing a node of a writer from within the list updates the prev field of its successor (to NULL), and releases its successor (by resetting the value of the successor's spin field).

As previously noted, in the KSUH algorithm, late updates of a node or one of the fields thereof (e.g., updates that occur long after the node has been removed from the queue) can lead to arbitrary behavior if the nodes are freed after removal. Thus, KSUH requires clients to store nodes in Type Stable Memory (TSM), meaning that a node must not be freed to the operating system, but can be reused as a node again in the future. The HTM-based reader-writer lock algorithms described herein may eliminate this issue, such that (as is the case with the nodes in the MCS lock algorithm) nodes can be stack allocated, which may yield a significant advantage for developers. In general, the HTM-based reader-writer lock algorithms described herein may simplify synchronization for the reader-writer lock when compared to previous reader-writer lock algorithms, and may eliminate this inconvenient requirement for client code.

In addition to simplifying the reader-writer lock algorithms, in some embodiments, the methods described herein may eliminate a subtle bug that has been discovered in the KSUH reader-writer lock algorithm. The bug involves synchronization for removing a node from a doubly-linked list, and can manifest itself in a variety of ways. For example, a pending write to the prev field of a node can occur even after the node has been recycled. If this occurs, it can cause a read-write exclusion violation, a write-write exclusion violation, a segmentation fault, or an infinite loop, in some cases. In a specific example, if the recycled node is reused as a reader node, a late store to reset its prev field can break the list, such that a departing reader may erroneously believe it is the last reader node in the list, and may therefore release a writer into the critical section, causing a read-write exclusion violation.

In various embodiments, the HTM-based reader-writer lock algorithms described herein may eliminate this bug. As discussed in more detail herein, there may also be ways to address this bug without using hardware transactional memory, including solutions that do not modify the implementation of the KSUH reader-writer lock algorithm, but impact how clients use it, and vice versa.

An evaluation of various reader-writer lock algorithms was performed using a system based on the prototype UltraS-PARC® Rock processor developed by Sun Microsystems, Inc. This processor supports hardware transactional memory. The evaluation showed that, in at least some embodiments, the HTM-based algorithms described herein may perform competitively with a corrected version of the KSUH reader-writer lock algorithm under reasonable workloads.

In some embodiments, a transactional reader-writer lock algorithm may include some of the structure of the KSUH reader-writer lock algorithm, but may be configured to take advantage of available hardware transactional memory, resulting in a simplified and improved reader-writer lock algorithm, when compared to KSUH algorithm. For example, as in the KSUH algorithm, inserting a node into the list may include updating a Tail variable to store a pointer to the new node and linking the new node into the list by by updating its prev field to point to its immediate predecessor (if one exists) and updating the next field of its immediate predecessor (if one exists) to point to the new node. Similarly, removing a node from the list may include updating the links in its predecessor and successor nodes (if they exist) to unlink the removed node from the list (i.e., to splice the node out of the list), and releasing its successor (if one exists) to acquire the lock by resetting the spin field of the successor node. However, in some embodiments, an HTM-based reader-writer lock algorithm may use hardware transactions to access (for reading and/or writing) one or more fields of the client-supplied nodes in a queue of such nodes and/or a Tail variable (sometimes referred to herein as a tail pointer) within its lock and/or unlock methods.

One embodiment of a method for implementing a reader-writer lock using hardware transactional memory is illustrated by the flow diagram in FIG. 1. As illustrated at 110, in this example, the method may include a thread executing in a system that includes hardware transactional memory and that wishes to access a critical section of code or a shared resource that is protected by a reader-writer lock initializing a state field, a spin field, and a next-node field of an object (i.e., a node). In some embodiments, these initializations may be performed using one or more non-transactional write operations to update the values of these fields. The method may include the thread inserting the newly initialized node in an ordered list of nodes (e.g., a doubly-linked list of client-provided nodes that makes up a queue), each node representing a thread that has acquired or wishes to acquire the reader-writer lock, as in 120. In some embodiments, inserting the node into the list may include updating the value of a Tail variable within a hardware transaction (i.e., a transaction supported by a hardware transactional memory implementation in which conflicts in the shared transactional memory space between transactions are resolved by a hardware implementation) or modifying a field of at least one node in the ordered list of nodes within a hardware transaction. For example, inserting the node may include writing a pointer value to a Tail variable identifying the newly initialized node as the last node in the list of nodes and/or updating the next-node field of the node on the list that will immediately precede the newly initialized node (once it is inserted at the tail end of the list) to indicate the position of the new node in the list.

As illustrated at 130, in this example, at some point after the node has been inserted in the list, the method may include the thread acquiring the reader-writer lock in a read-only mode or in a write mode, dependent on the value of the state field of the node. For example, the thread may acquire the reader-writer lock if its node reaches the head of the queue or if it is a reader thread whose node immediately succeeds the node of another reader that has acquired the reader-writer lock in a read-only mode. In this example, subsequent to the thread acquiring the reader-writer lock, the method may include the thread releasing the reader-writer lock (e.g., once access to the critical section or shared resource is no longer needed), and removing the inserted node from the ordered list of nodes, as in 140. In some embodiments, removing the node may include updating the value of the tail pointer within a hardware transaction or modifying a field of at least one of the nodes in the ordered list of nodes within a hardware transaction. For example, if the Tail variable points to the node being removed, removing the node may include updating the value of the Tail variable (e.g., to a NULL value or to a value identifying a node that was inserted before the node being removed as the last node in the list of nodes). Removing the node may include updating the next-node and/or previous-node fields of the nodes that were on either side of the node in the ordered list of nodes (prior to its removal). In some embodiments, once the lock has been released by the thread and its node has been removed from the list of nodes, the method may include the thread freeing the memory that was allocated for the inserted node back to the operating system, as in 150.

Figure 2:
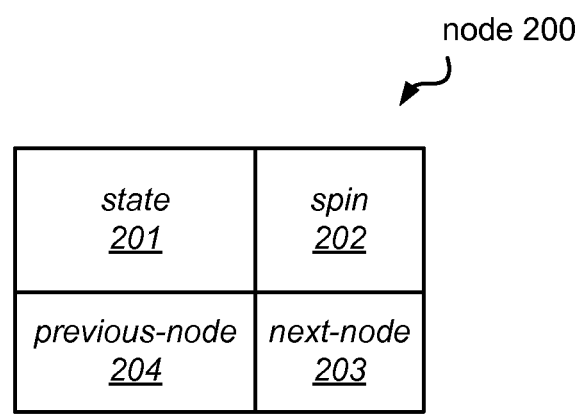
FIG. 2 is a block diagram illustrating one node of a queue type data structure representing a reader-writer lock, according to different embodiments.

As previously noted, in some embodiments, the HTM-based reader-writer lock described herein may be implemented as list-based queue type locks. FIG. 2 is a block diagram illustrating one node of a queue type data structure representing a reader-writer lock, according to different embodiments. In this example, node 200 represents one node of a doubly-linked ordered list of client-provided nodes that make up a reader-writer lock structure, and this node may be said to be owned by a given thread of a multithreaded application that holds or desires to acquire the reader-writer lock. In this example, node 200 includes a state field 210, a spin field 202, a previous-node field 204 (which may also be referred to herein as the "prev" field), and a next-node field 203 (which may also be referred to herein as the "next" field). In some embodiments, the value of the state field may indicate whether the given thread has acquired (or desires to acquire) the shared reader-writer lock in a read-only mode or in a write mode. In this example, the value of the next-node field may indicate which, if any, node succeeds node 200 in the ordered list of nodes, while the value of the previous-node field may indicate which, if any, node precedes node 200 in the ordered list of nodes. In this example, the value of the spin field may indicate whether (or not) the given thread must wait to acquire the shared reader-writer lock, as described in more detail below.

One embodiment of a transactional reader-writer lock algorithm that represents a reader-writer lock as a doubly-linked ordered list of nodes is illustrated by the example pseudo code below. In this example, which may be referred to herein as the TxLock algorithm, hardware transactions may be used to perform various updates to the ordered list and/or to record state needed to determine actions to be taken after such a transaction commits. In some embodiments, the use of these hardware transactions may simplify the reader-writer lock algorithm (when compared to the KSUH algorithm) and may eliminate the need for the per-node locks used by the KSUH algorithm. In some embodiments of reader-writer locks that implement the TxLock algorithm, shared variables may be accessed only within transactions, with the following exceptions: initialization of a node's fields (e.g., before the node is made "public" by inserting it into the ordered list of nodes) may be performed without synchronization, and accesses to spin variables (e.g., by threads waiting for the values of these variables to change and/or by threads that change their values) may also be performed non-transactionally. For example, if a thread inserts a node and spins on its spin field within the same transaction, it may never be able to exit the spin (e.g., because the node will not become visible and, thus, no other thread will be able to reset its spin field). In some embodiments, the spinning may be performed in a separate transaction (e.g., after the transaction that inserts the node into the list has committed). However, in this case, a waiting transaction would be caused to abort by the event for which it is waiting, and would have to retry, which may harm performance. In other embodiments, such as the one illustrated in the pseudo code below, the spinning may be performed non-transactionally and this may not complicate the algorithm significantly. In another example, it may be preferable for waiting threads to be released (e.g., by resetting their spin fields) using non-transactional stores rather than within a transaction, because a transaction attempting to modify a variable on which another thread is spinning may have its transaction aborted due to the spinning thread. In some embodiments, updating spin variables non-transactionally may not significantly complicate the reader-writer lock algorithm.

The locking and unlocking methods of the HTM-based reader-writer lock algorithms described herein may be further illustrated by the pseudo code below, according to one embodiment. In this example, the writerLock and writerUnlock procedures are largely self-explanatory and are illustrated in more detail in FIG. 5 and FIG. 6, respectively. In this example, when a thread invokes the readerLock procedure, the first transaction in the readerLock procedure (shown in lines 24-30) causes the thread to insert a new node into the list and also to record (in a local variable called predState) the state of the node that was previously pointed to by Tail, if any exists. If that node exists and its status is not ACTIVE READER, the thread then spins, waiting for its predecessor to release it. Once this has occurred, the readerLock procedure uses another transaction (shown in lines 34-36) to atomically change its state to ACTIVE READER and to record an identifier of (e.g., a pointer to) the next node in the list, if any exists, in a local variable called next. If a next node exists and it is a reader, the thread releases the thread that owns the next node (as shown in line 40).

In this example, when a thread invokes the readerUnlock procedure, this procedure uses a transaction (shown in lines 42-51) to remove the departing thread's node from the list. If the removed node has no predecessor, the transaction records the state of the next node in a local variable called succState. If the recorded state indicates a that the next node is one whose owning thread is a writer, the owning thread of the next node is released into the critical section (shown in line 52), since this indicates that the departing thread was the last reader thread that preceded it into the critical section.

In some embodiments, the use of hardware transactions makes the locking and unlocking procedures shown below simpler than and easier to reason about than the procedures of the KSUH reader-writer lock algorithm. For example, this HTM-based reader-writer lock does not require the use of the per-node locks used in the KSUH algorithm, which both saves space and eliminates the need to reason about the locks. In addition, even though the readerUnlock procedure of the TxLock algorithm resets the successor's prev field without regard to whether it is a reader or a writer (as shown in line 47), this does not compromise the correctness of the TxLock algorithm or require it to use type stable memory because this write to the prev field is performed within a transaction that first confirms that the node being written is still the successor of the writing thread's node, which itself is still in the list.

Note also that, unlike with the KSUH algorithm, in the TxLock algorithm, if a part of the list of nodes that the transaction accesses changes after a thread determines its node's predecessor and before it is able to lock the predecessor, the transaction will abort and be retried, and this will be hidden by the transaction construct. In some embodiments of the TxLock algorithm, this allows nodes to be freed after use. Note also that in both the readerLock and writerLock procedures (in this example), the next field of the node previously pointed to by Tail is set to point to the newly introduced node atomically with setting Tail to point to this node. Therefore, there is no "intermediate" state in which Tail already points to a new node, but the previous node's next field has not yet been set to point to the new node. Thus (unlike in the KSUH algorithm in which it is possible to be in this intermediate state), the TxLock algorithm does not need to handle this case. Finally, the use of transactions in the TxLock algorithm may ensure that when a reader thread is setting the status of its node to ACTIVE READER before entering the critical section, that reader thread will either see a node of a successor reader (and thus reset its spin field so the successor can also enter the critical section), or the successor will see the reader thread's status as ACTIVE READER when it links in its node (and thus, it knows it can enter the critical section). As a result, the successor node may never have to wait while the reader thread is in the critical section. In contrast, in the KSUH algorithm, it is possible that a reader thread reads its next field before a successor thread sets it, and thus the reader does not release the successor. Instead, the successor checks the status of the reader thread before the reader sets its status to ACTIVE READER, and therefore waits even though it could enter the critical section. In the TxLock algorithm described herein, the readerUnlock procedure resets the spin field value of the successor only if it is a writer, because the above-described scenario in which a successor reader may wait for a reader to release it even though the reader has already entered the critical section cannot happen.

One embodiment of the TxLock algorithm described above is illustrated by the locking and unlocking procedures in the following pseudo code.

```
1     procedure writerLock(Tail, I)
2         I→state = WRITER;
3         I→spin = 1;
4         I→next = NULL;
5         atomically
6             pred = Tail;
7             Tail = I;
8             if (pred) pred→next = I;
9         if (pred) while (I→spin) Pause( );
10
11    procedure writerUnlock(Tail, I);
12        atomically
13            next = I→next;
14            if (!next)
15                Tail = NULL;
16            else
17                next→prev = NULL;
18            if (next) next→spin = 0;
19
20    procedure readerLock(Tail, I)
21        I→state = READER;
22        I→spin = 1;
23        I→next = I→prev = NULL;
24        atomically
25            pred = Tail;
26            Tail = I;
27            if (pred)
28                I→prev = pred;
29                pred→next = I;
30                predState = pred→state;
31
32        if (pred != NULL && predState != ACTIVE_READER)
33            while (I→spin) Pause( );
34        atomically
35            I→state = ACTIVE_READER;
36            next = I→next;
37            if (next && next→state == READER)
38                next→spin = 0;
39
40    procedure readerUnlock(Tail, I)
41        succState = UNDEF_STATE;
42        atomically
43            pred = I→prev;
44            next = I→next;
45            if (pred) pred→next = next;
46            if (next)
47                next→prev = pred;
48                if (!pred)
49                    succState = next→state;
50                else
51                    Tail = pred;
52            if (succState == WRITER) next→spin = 0;
```

The TxLock transactional reader-writer locks described above may be further illustrated by the flow diagrams in FIGS. 3-6. For example, one embodiment of a method for a reader thread to acquire a reader-writer lock is illustrated by the flow diagram in FIG. 3. The operations illustrated in FIG. 3 may be performed directly by the reader thread or by a method, function, or procedure (e.g., the readerLock procedure described above) that is called or invoked by the reader thread, in different embodiments. As illustrated at 310, in this example, the method may include a thread that wishes to acquire a lock on a shared resource in a read-only mode initializing a node to be inserted in an ordered list of client-provided nodes that make up a reader-writer lock structure using one or more non-transactional write accesses. For example, in some embodiments, the method may include initializing both the prev and the next fields of a new node to a value of NULL. The method may then include the reader thread invoking a hardware transaction to insert the node into the ordered list (e.g., by updating a tail pointer to indicate that the new node has been added as the last node in the ordered list), record the state of the node (if any) immediately preceding it, and update the prev pointer to and the next pointer from a node that precedes the new node in the ordered list (if any) to identify and/or define the position of the new node in the ordered list, as in 320.

Figure 3:
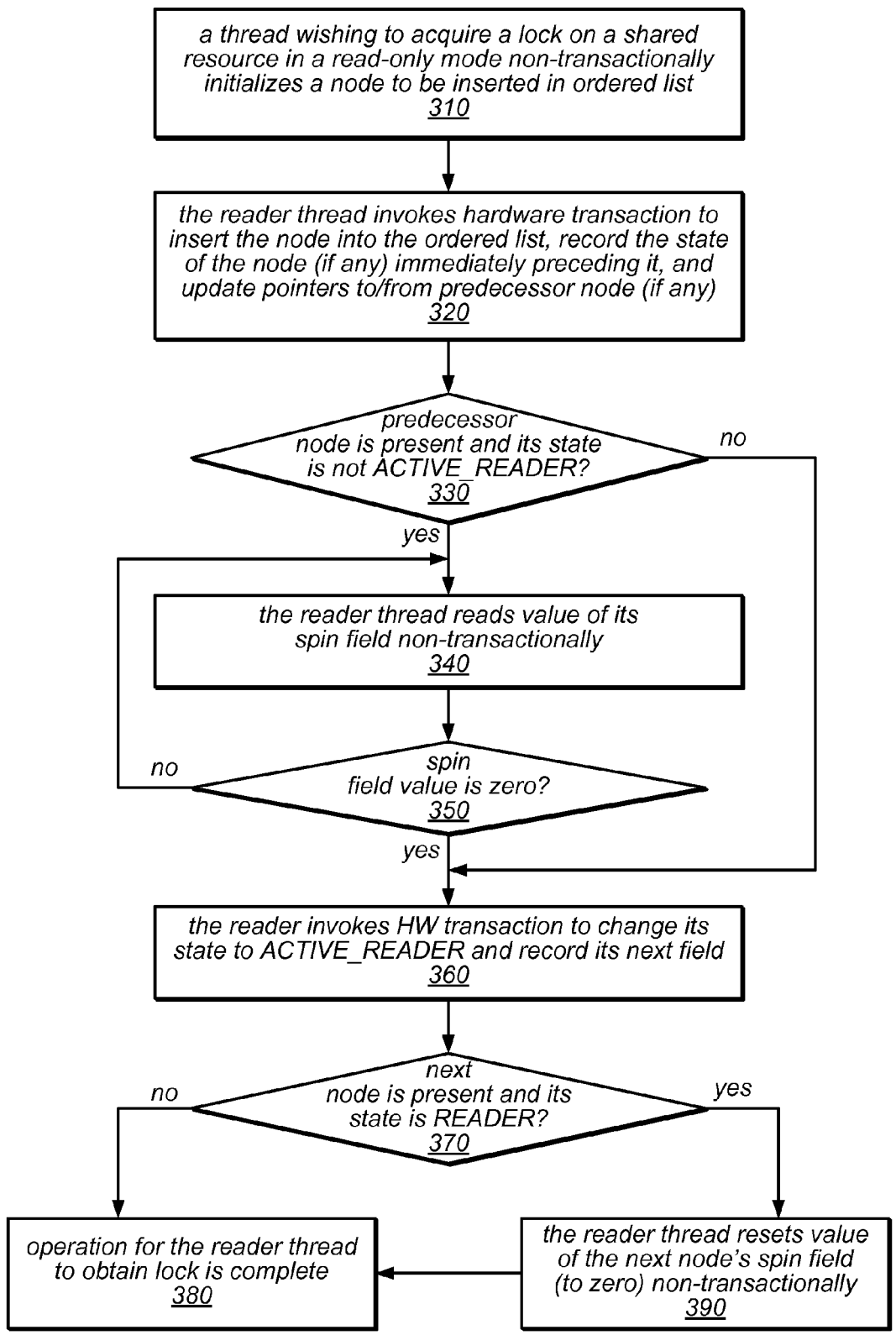
FIG. 3 is a flow diagram illustrating one embodiment of a method for a reader thread to acquire a reader-writer lock.

As illustrated in this example, if there is a predecessor node present and its state is not ACTIVE_READER (shown as the positive exit from 330), the method may include the reader thread reading the value of its spin field outside of a transaction (i.e., non-transactionally), as in 340. If the spin field value is non-zero, shown as the negative exit from 350, the method may include repeating the operations illustrated in 340-350 until the spin field value is zero (i.e., until the predecessor node resets the spin field value of the new node to indicate that it can proceed to acquire the reader-writer lock in a read-only mode). This is illustrated in FIG. 3 by the feedback from the negative exit of 350 to 340.

If the new node has no predecessor (i.e., if it is the first node in the ordered list) or if the state of its predecessor is ACTIVE-READER (shown as the negative exit from 330), or once the spin field value of the new node is zero (shown as the positive exit from 350), the method may include the reader thread invoking a hardware transaction to change its state to ACTIVE_READER and to record the value of its next field, as in 360.

As illustrated in this example, if at this point a successor node (i.e., a node identified by the next field of the new node) is not present or the state of such a successor node is not READER (shown as the negative exit from 370), the operation for the reader thread to obtain the reader-writer lock in read-only mode may be complete, as in 380. However, if a successor node is present and the state of the successor node is READER (shown as the positive exit from 370), the method may include the reader thread resetting the value of the successor node's spin field (to zero) using a non-transactional write operation (as in 390), after which the operation for the reader thread to obtain the reader-writer lock in read-only mode may be complete, as in 380. In this example, resetting the spin field value of the successor node may allow the successor node to enter the critical section or access the shared resource that is protected by the reader-writer lock for reading as well.

Figure 4:
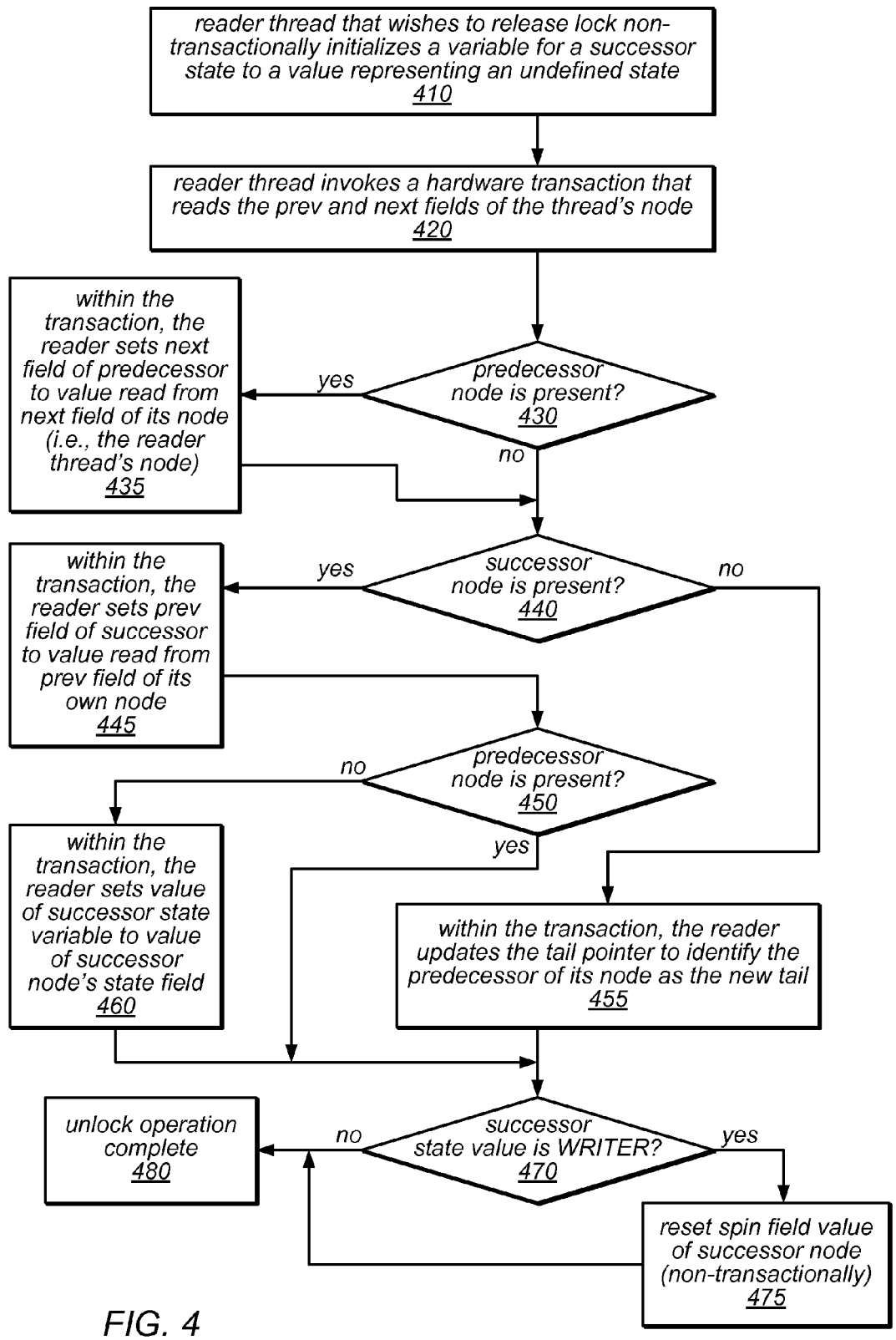
FIG. 4 is a flow diagram illustrating one embodiment of a method for a reader thread to release a reader-writer lock.

One embodiment of a method for a reader thread to release a reader-writer lock is illustrated by the flow diagram in FIG. 4. The operations illustrated in FIG. 4 may be performed directly by the reader thread or by a method, function, or procedure (e.g., the readerUnlock procedure described above) that is called or invoked by the reader thread, in different embodiments. As illustrated at 410, in this example, the method may include a reader thread that wishes to release a lock initializing a variable that represents the state of a successor node in an ordered list of client-provided nodes that make up a reader-writer lock structure to a value representing an undefined state using a non-transactional write access. The method may also include the reader thread invoking a hardware transaction that reads the prev and next fields of the reader thread's own node in the ordered list, as in 420. If there is a predecessor node present (i.e., if the reader thread's node is not at the head of the ordered list), shown as the positive exit from 430, the method may include the reader thread (within the hardware transaction) setting the next field of the predecessor node to value that was read from next field of its own node (i.e., the reader thread's node), as in 435. This may link the predecessor node to the node that will succeed it once the reader's own node is removed from the list. In this example, determining whether or not a predecessor node is present may include the reader thread determining whether the prev field of its own node includes a pointer value that identifies a predecessor node or includes a NULL value. Otherwise (shown as the negative exit from 430), if no predecessor node is present (e.g., if the value of the prev field is NULL), the operation illustrated at 435 may be skipped.

As illustrated in this example, if there is successor node present (i.e., if the reader thread's node is not the tail of the ordered list), shown as the positive exit from 440, the method may include the reader thread (within the hardware transaction) setting the prev field of the successor node to value that was read from prev field of its own node (i.e., the reader thread's node), as in 445. This may link the successor node to the node that will precede it once the reader's own node is removed from the list. In this example, determining whether or not a successor node is present may include the reader thread determining whether the next field of its own node includes a pointer value that identifies a successor node or includes a NULL value. Otherwise (shown as the negative exit from 440), if no successor node is present (e.g., if the value of the next field is NULL), the method may include the reader thread (within the transaction) updating a tail pointer to identify the predecessor of its node as the new tail of the list, as in 455, and the reader's node is effectively removed from the list.

As illustrated in this example, if there is a successor node present, but there is not a predecessor node present (shown as the negative exit from 450), the method may include the reader thread (within the transaction) setting the value of the successor state variable to a value read from the state field of the successor node, as in 460. In this example, the reader thread may read the value of the state field of the successor node within the transaction. On the other hand, if there is a successor node present, but there is no predecessor node present (shown as the negative exit from 450), the operation to update the value of the successor state variable may be skipped.

Once the reader's node has been unlinked from any predecessor and/or successor nodes (and, if necessary, the tail pointer has been updated), if the successor state value indicates that the successor node is not owned by a writer thread (shown as the negative exit from 470), the unlock operation may be complete, as in 480. On the other hand, if the successor state value indicates that the successor node is owned by a writer thread (shown as the negative exit from 470), the method may include the reader thread resetting the spin field value of the successor node using a non-transactional write operation (as in 475), after which the unlock operation may be complete, as in 480. In this example, resetting the spin field value of the successor may allow the writer thread to acquire the reader-writer lock in a write-only mode in order to enter the critical section or access the shared resource protected by the lock for writing. Note that, as described herein, once the reader thread's node has been removed from the list, it may be freed by the application. For example, the memory allocated to the node may be returned to the operating system for subsequent reuse by the application or by another application, in different embodiments.

Figure 5:
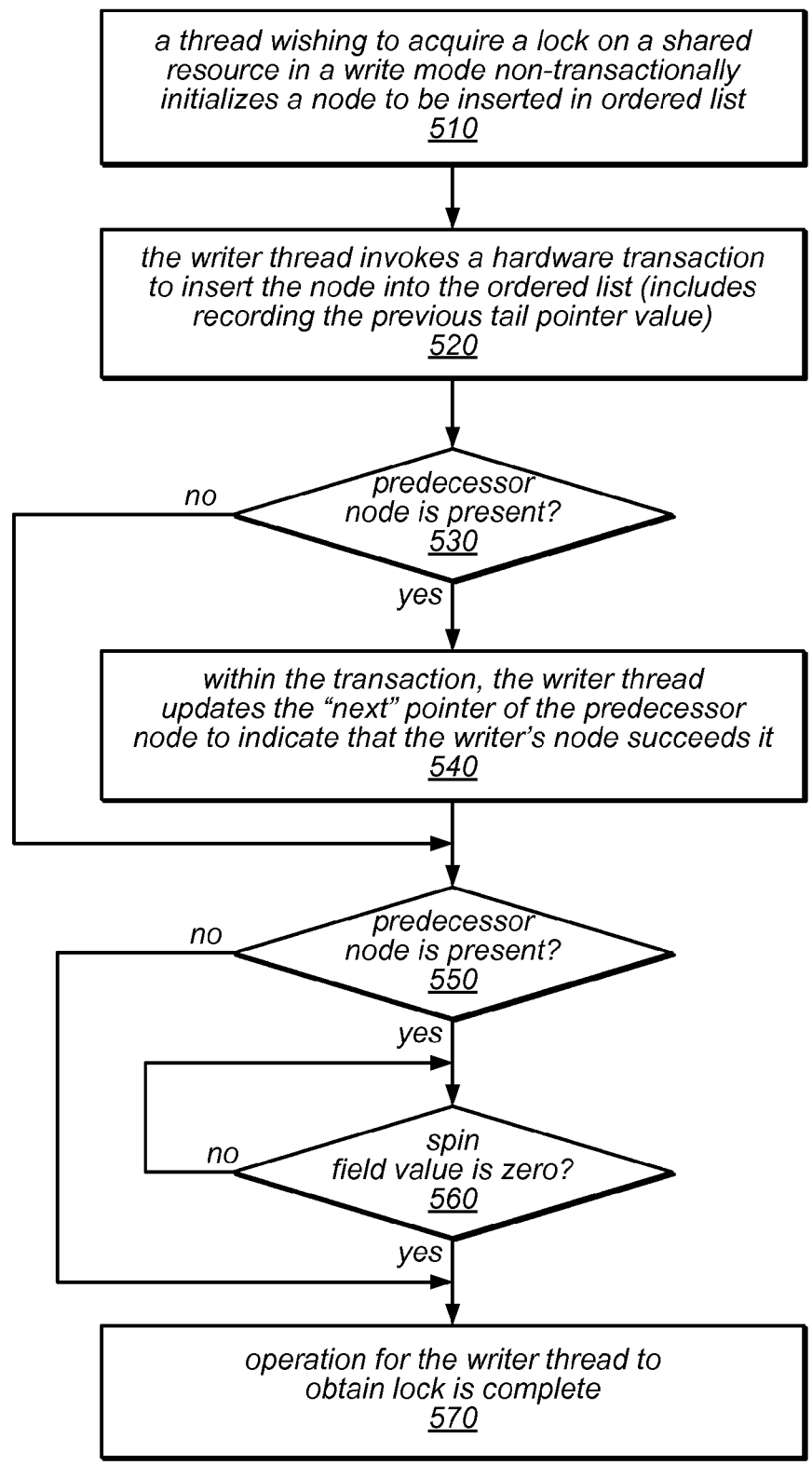
FIG. 5 is a flow diagram illustrating one embodiment of a method for a writer thread to acquire a reader-writer lock.

One embodiment of a method for a writer thread to acquire a reader-writer lock is illustrated by the flow diagram in FIG. 5. The operations illustrated in FIG. 5 may be performed directly by the writer thread or by a method, function, or procedure (e.g., the writerLock procedure described above) that is called or invoked by the writer thread, in different embodiments. As illustrated at 510, in this example, the method may include a thread that wishes to acquire a lock on a shared resource in a write mode initializing a node to be inserted in an ordered list of client-provided nodes that make up a reader-writer lock structure using one or more non-transactional write operations. For example, in some embodiments, the method may include initializing the next field of a new node to a value of NULL. The method may then include the writer thread invoking a hardware transaction to insert the node into the ordered list (e.g., by recording the value of a tail pointer in a local variable and updating the tail pointer to indicate that the new node has been added as the last node in the ordered list), as in 520. If there is a predecessor node present in the list (i.e., if the new node is not the first node in the list, shown as he positive exit from 530), the method may include the writer thread (within the transaction) updating a pointer (e.g., the next pointer) from the predecessor node to indicate that the writer's node succeeds it in the list, as in 540. In this example, determining whether or not there is a predecessor node in the list may include determining whether the previously recorded value of the tail pointer identifies a predecessor node or is a NULL value. If there is not a predecessor node present (e.g., if the previously recorded value of the tail pointer is a NULL value), the operation illustrated at 540 may be skipped.

As illustrated in this example, the method may include determining (outside of the transaction) whether a predecessor node is present in the list (as in 550). If so (shown as the positive exit from 550), and if the value of the spin field of the new node is non-zero (shown as the positive exit from 560), the method may include spinning on the value of the spin field until it is reset to zero. This is illustrated in FIG. 5 by the feedback from the negative exit of 560 to 560. In this example, determining whether or not there is a predecessor present may include using the previously recorded value of the tail pointer, and spinning on the value of the spin field may include reading the value of the spin field using one or more non-transactional read operations until the value of the spin field is zero (i.e., until the predecessor node resets the spin field value of the new node to indicate that it can proceed to acquire the reader-writer lock in a write mode).

If there is no predecessor node (shown as the negative exit from 550), or once a predecessor thread has reset the new node's spin field, the writer thread that owns the new node may be free to acquire the reader-writer lock in a write mode, and the operation for the writer thread to obtain the reader-writer lock may be complete as in 570. Subsequently, the writer thread may enter the critical section or access the shared resource that is protected by the reader-writer lock for writing.

Figure 6:
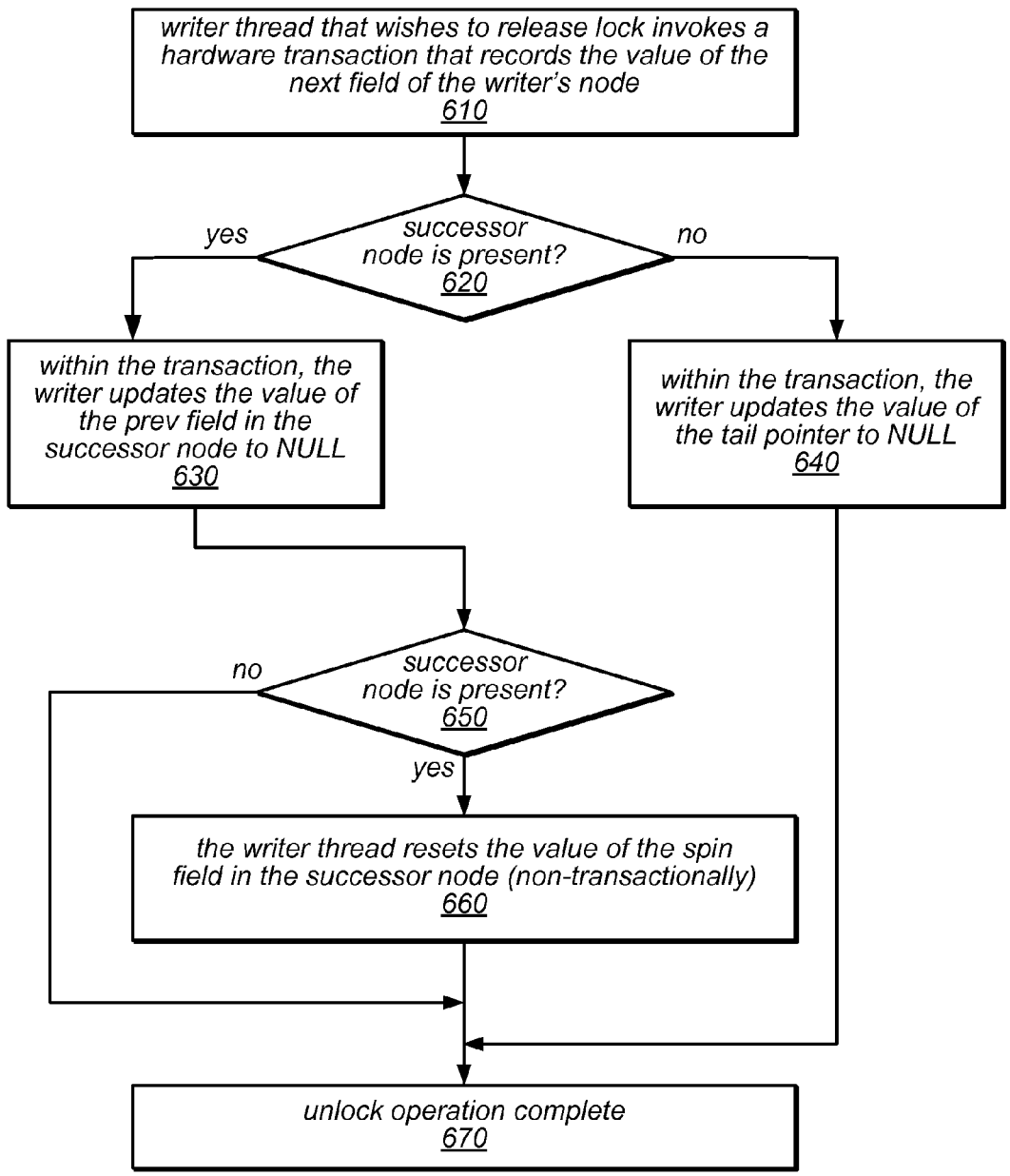
FIG. 6 is a flow diagram illustrating one embodiment of a method for a writer thread to release a reader-writer lock.

One embodiment of a method for a writer thread to release a reader-writer lock is illustrated by the flow diagram in FIG. 6. The operations illustrated in FIG. 6 may be performed directly by the writer thread or by a method, function, or procedure (e.g., the writerUnlock procedure described above) that is called or invoked by the writer thread, in different embodiments. As illustrated at 610, in this example, the method may include a writer thread that wishes to release lock invoking a hardware transaction that records the value of the next field of a node that is owned by the writer and is part of an ordered list of client-provided nodes that make up a reader-writer lock structure. If a successor node is present, shown as the positive exit from 620, the method may include the writer thread (within the transaction) updating the value of the prev field in the successor node to NULL, as in 630, since the successor node will be the new head of the list when the writer's own node is removed from the list. In this example, determining whether or not a successor node is present may include the writer thread reading the value of the next field of its own node (within the transaction) to determine whether that value identifies a successor node or is a NULL value. If no successor node is present (shown as the negative exit from 620), the method may include the writer thread (within the transaction) updating the value of a tail pointer to NULL, as in 640. At this point, the writer's node is removed from the ordered list of client-provided nodes that make up the reader-writer lock structure, and the unlock operation is complete (as in 670).

As illustrated in this example, the method may include determining (outside of the transaction) whether or not there is a successor node present in the ordered list, as in 650. For example, determining whether or not there is a successor node may include the writer thread using the previously recorded value of the next field of the writer's node to determine whether it identifies a successor node or is a NULL value. If there is not a successor node present (shown as the negative exit from 650), the unlock operation may be complete, as in 670. However, if there is a successor node present (shown as the positive exit from 650), the method may include the writer thread resetting the value of the spin field in the successor node using a non-transactional write operation, as in 660, after which the unlock operation may be complete, as in 670. In this example, resetting the spin field value of the successor node may allow the thread that owns the successor node to proceed to acquire the reader-writer lock. Note that, as described herein, once the writer thread's node has been removed from the list, it may be freed by the application. For example, the memory allocated to the node may be returned to the operating system for subsequent reuse by the application or by another application, in different embodiments.

Figure 7D:
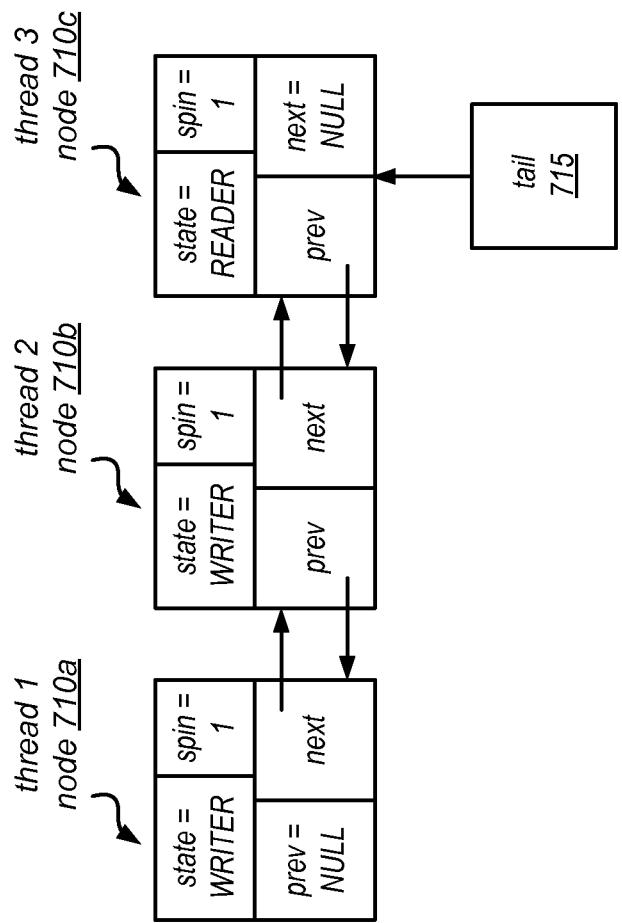
Figure 7E:
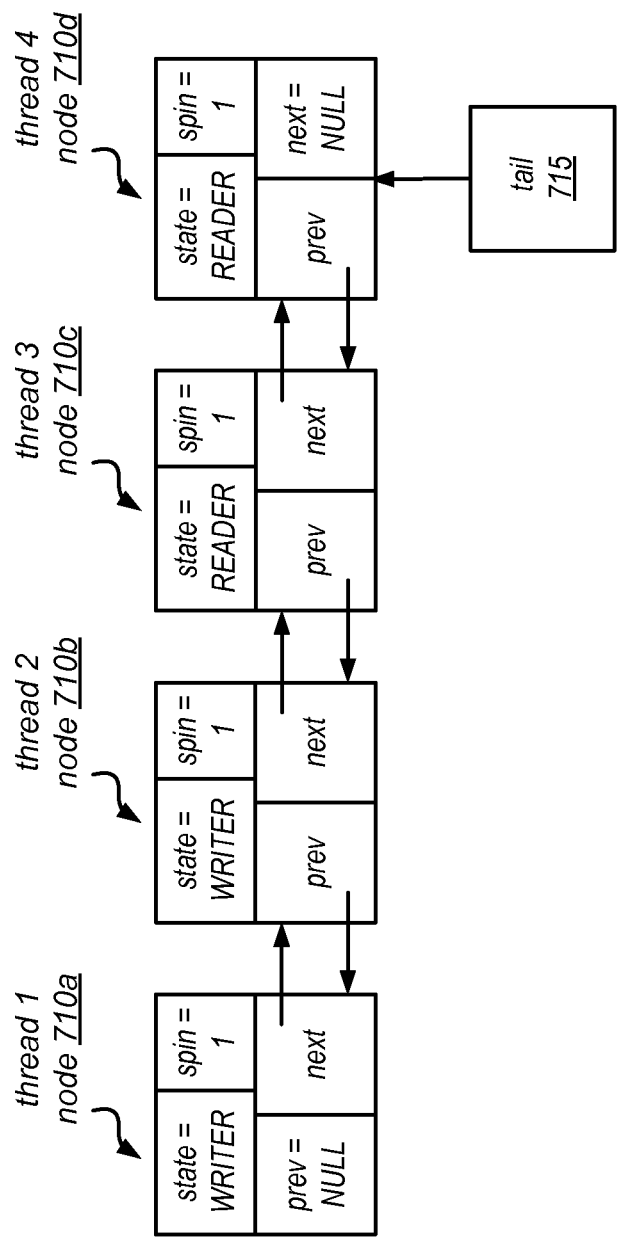

One example of the use of the transactional reader-writer locks described herein is illustrated by the block diagrams in FIGS. 7A-7K, according to one embodiment. In this example, an HTM-based reader-writer lock controls access to a critical section of code. FIG. 7A illustrates a default or initial condition in which there are no threads in the critical section or waiting to enter the critical section. In this case, there are not any client-provided nodes representing the reader-writer lock, and the value of the lock's tail pointer 715 is NULL. FIG. 7B illustrates a state in which a thread 1 (in this case, a writer thread), wishing to enter the critical section for writing, has invoked a lock operation (e.g., a writerLock procedure). The lock operation has initialized a node 710a on behalf of thread 1 (which owns the node) and has inserted node 710a into a doubly-linked list representing a reader-writer lock structure as the only node in the list. In this example, the lock operation has initialized the state field of node 710a to WRITER (to indicate that thread 1 is a writer thread), the spin field of node 710a to a value of 1 (which is its default/initial value), and the prev and next fields of node 710a to NULL values (since there are no predecessor or successor nodes in the list), all using non-transactional write operations. In this example, to insert the new node into the list, the lock operation has invoked a transaction that updates (or swaps) the value of tail pointer 715 to indicate that node 710a is the tail of the list. When the reader-writer lock structure is in the state illustrated in FIG. 7B, thread 1 (and only thread 1) holds the lock and can enter the critical section.

FIG. 7C illustrates a state in which a thread 2 (in this case, another writer thread), wishing to enter the critical section for writing, has invoked a lock operation (e.g., a writerLock procedure). The lock operation has initialized a node 710b on behalf of thread 2 (which owns node 710b) and has inserted node 710b into the doubly-linked list representing the reader-writer lock structure as the second node in the list. In this example, the lock operation has initialized the state field of node 710b to WRITER (to indicate that thread 2 is a writer thread), the spin field of node 710b to a value of 1 (which is its default/initial value), and the next field of node 710b to a NULL value (since there is no other node succeeding node 710b in the list), all using non-transactional write operations. Inserting the new node 710b included invoking a transaction that updated the prev field of newly inserted node 710b to point to the node that was previously the tail (i.e., node 710a), updated the next field of node 710a to point to node 710b as its successor, and updated (or swapped) the value of tail pointer 715 to indicate that node 710b is the new tail of the list. At this point, thread 1 is still the only thread that holds the lock and can enter the critical section.

FIG. 7D illustrates a state in which a thread 3 (in this case, a reader thread), wishing to enter the critical section for reading, has invoked a lock operation (e.g., a readerLock procedure). The lock operation has initialized a node 710c on behalf of thread 3 (which owns node 710c) and has inserted node 710c into the doubly-linked list representing the reader-writer lock structure as the third node in the list. In this example, the lock operation has initialized the state field of node 710c to READER (to indicate that thread 3 is a reader thread), the spin field of node 710c to a value of 1 (which is its default/initial value), and the next field of node 710c to a NULL value (since there is no other node succeeding node 710c in the list). In this example, inserting the new node 710c included invoking a transaction that updated the prev field of newly inserted node 710c to point to the node that was previously the tail (i.e., node 710b), updated the next field of node 710b to point to node 710c as its successor, and updated (or swapped) the value of tail pointer 715 to indicate that node 710c is the new tail of the list. At this point, thread 1 is still the only thread that holds the lock and can enter the critical section.

FIG. 7d illustrates a state in which a thread 4 (in this case, another reader thread), wishing to enter the critical section for reading, has invoked a lock operation (e.g., a readerLock procedure). The lock operation has initialized a node 710d on behalf of thread 4 (which owns node 710d) and has inserted node 710d into the doubly-linked list representing the reader-writer lock structure as the fourth node in the list. In this example, the lock operation has initialized the state field of node 710*d* to READER (to indicate that thread 4 is a reader thread), the spin field of node 710*d* to a value of 1 (which is its default/initial value), and the next field of node 710*d* to a NULL value (since there is no other node succeeding node 710*d* in the list), all using non-transactional write operations. In this example, inserting the new node 710*d* included invoking a transaction that updated the prev field of newly inserted node 710*d* to point to the node that was previously the tail (i.e., node 710*c*), updated the next field of node 710*c* to point to node 710*d* as its successor, and updated (or swapped) the value of tail pointer 715 to indicate that node 710*d* is the new tail of the list. At this point, thread 1 is still the only thread that holds the lock and can enter the critical section.

Figure 7G:
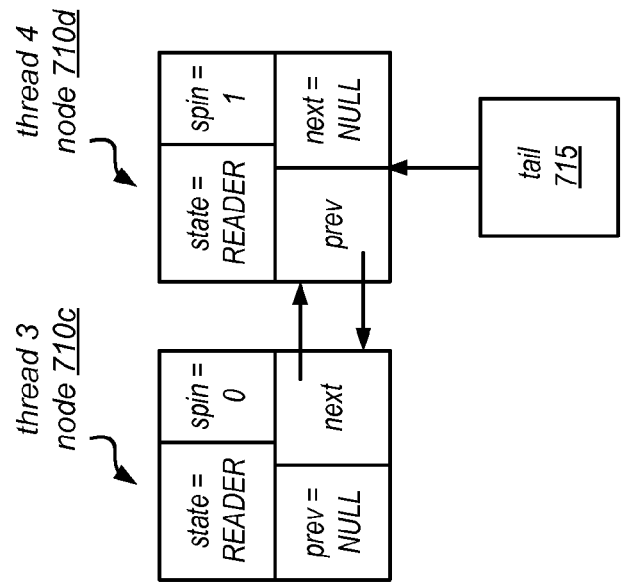
Figure 7F:
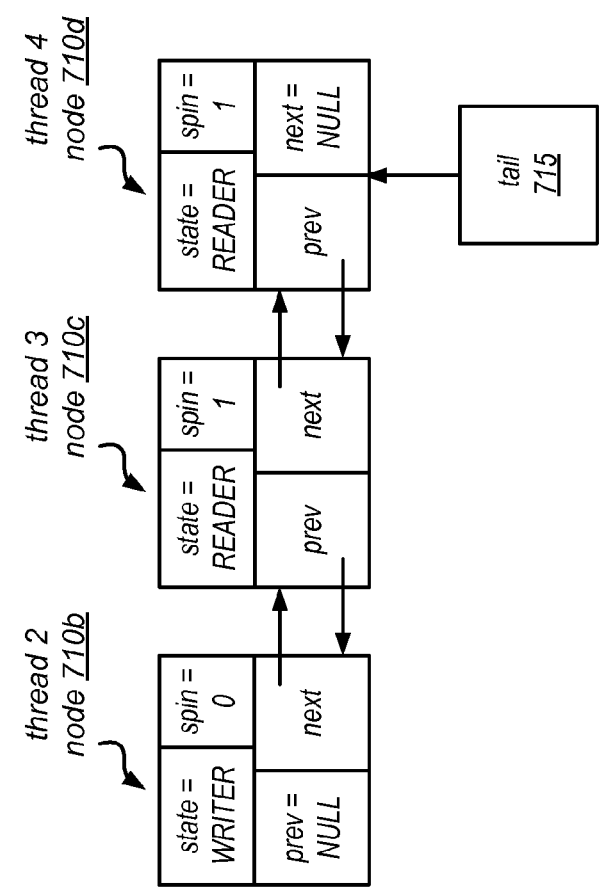

FIG. 7F illustrates a state in which the first writer thread (i.e., thread 1, represented in the reader-writer lock structure by node 710*a*) has finished its work in the critical section (e.g., it has exited the critical section that is protected by the reader-writer lock) and has invoked an unlock operation (e.g., a writerUnlock procedure) in order to release the lock. In this example, the unlock operation has removed node 710*a* from the reader-writer structure, which included invoking a transaction that updated the value of the prev field of node 710*b* to NULL (since node 710*a* no longer precedes node 710*b* in the list). In some embodiments, the unlock operation may also remove the reference to node 710*b* in the next field of node 710*a* (e.g., by updating the value of the next field of node 710*a* to a NULL value, not shown). In this example, the unlock operation has also performed a non-transactional write operation to reset the spin field value of node 710*b*, which is owned by the second writer (thread 2), and which is now at the head of the list. There are no changes to any other nodes in the lock structure due to this unlock operation. Note that at this point, the memory that was allocated to node 710*a* may or may not be returned to the operating system, as described herein. In other words, it may be safe for the application to do so, but the application may be configured to reuse nodes within same application instead. At this point, thread 2 (and only thread 2) holds the lock and can enter the critical section.

FIG. 7G illustrates a state in which the second writer thread (i.e., thread 2, represented in the reader-writer lock structure by node 710*b*) has finished its work in the critical section (e.g., it has exited the critical section that is protected by the reader-writer lock) and has invoked an unlock operation (e.g., a writerUnlock procedure) in order to release the lock. In this example, the unlock operation has removed node 710*b* from the reader-writer structure, which included invoking a transaction that updated the value of the prev field of node 710*c* to NULL (since node 710*b* no longer precedes node 710*c* in the list). In some embodiments, the unlock operation may also remove the reference to node 710*c* in the next field of node 710*b* (e.g., by updating the value of the next field of node 710*b* to a NULL value, not shown). In this example, the unlock operation has also reset (using a non-transactional write operation) the spin field value of node 710*c*, which is owned by the first reader (thread 3), and which is now at the head of the list. Note that at this point, the memory that was allocated to node 710*b* may or may not be returned to the operating system, as described herein. In other words, it may be safe for the application to do so, but the application may be configured to reuse nodes within same application instead. At this point, thread 3 holds the lock for reading and can enter the critical section.

Figure 7I:
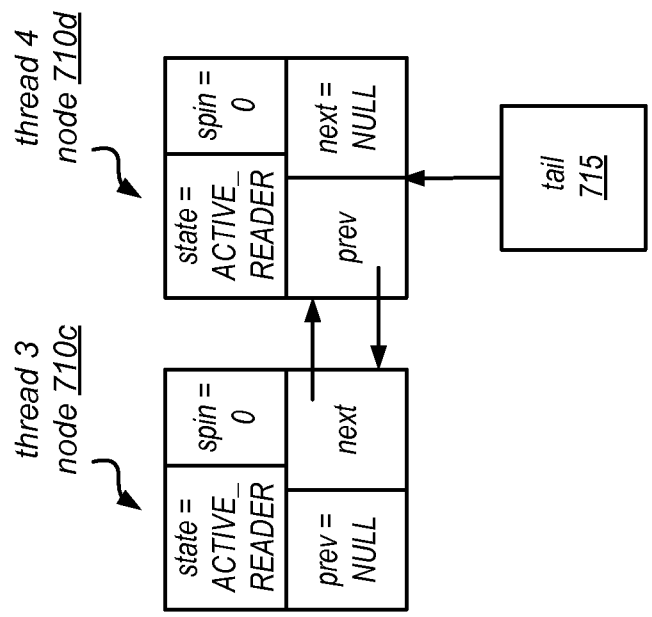
Figure 7H:
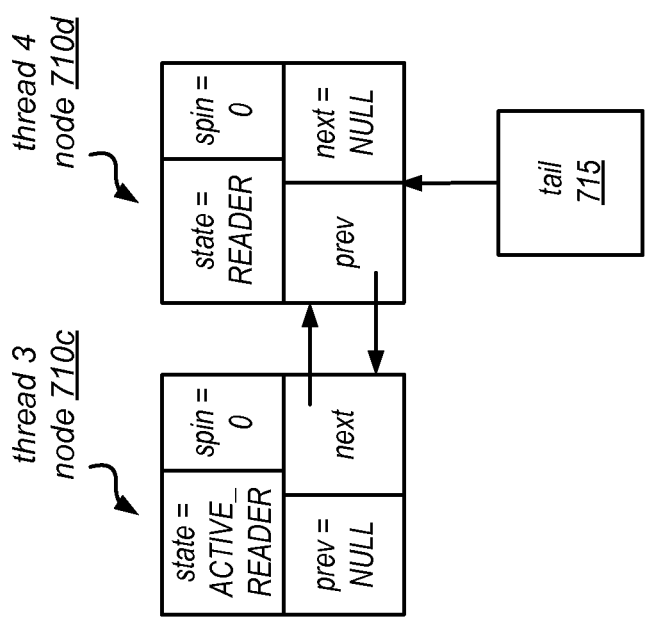

FIG. 7H illustrates a state in which the first reader (thread 3, represented in the lock structure by node 710*c*), as part of its readerLock procedure, has updated its state to ACTIVE_READER, and has entered the critical section. Thread 3 has also determined that the node succeeding it in the list (i.e., node 710*d*) represents a second reader thread (thread 4), and has reset the value of the spin field of node 710*d*. At this point, thread 4 can acquire the lock for reading and enter the critical section, while thread 3 is still in the critical section. FIG. 7I illustrates a state in which the second reader (thread 4), as part of its readerLock procedure, has updated its state to ACTIVE_READER, and has entered the critical section. In other words, at this point, both thread 3 and thread 4 hold the lock for reading and are in the critical section.

FIG. 7J illustrates a state in which, while both reader threads (i.e., threads 3 and 4, represented by nodes 710*c* and 710*d*) are in the critical section, another thread (thread 5, which is a writer), wishing to enter the critical section, has invoked a lock operation (e.g., a writerLock operation), which has initialized and inserted node 710*e* into the doubly-linked list representing the reader-writer lock structure as the third node in the list. In this example, the lock operation has initialized the state field of node 710*e* to WRITER (to indicate that thread 5 is a writer thread), the spin field of node 710*e* to a value of 1 (which is its default/initial value), and the next field of node 710*e* to a NULL value (since there is no other node succeeding node 710*e* in the list), all using non-transactional write operations. Inserting the new node 710*e* included invoking a transaction that updated the prev field of newly inserted node 710*e* to point to the node that was previously the tail (i.e., node 710*d*), updated the next field of node 710*d* to point to node 710*e* as its successor, and updated (or swapped) the value of tail pointer 715 to indicate that node 710*e* is the new tail of the list. At this point, threads 3 and 4 are both still in the critical section, and thread 5 must wait until the spin field value in its node (node 710*e*) has been reset before it can acquire the lock for writing and enter the critical section.

FIG. 7K illustrates a state in which both reader threads (i.e., threads 3 and 4, represented by nodes 710*c* and 710*d*) have exited the critical section and invoked unlock operations to release the lock. In this example, when the last one of these reader threads to be in the critical section completed its unlock operation (which might or might not have been the first of the two readers to enter the critical section or to invoke an unlock operation) it reset (using a non-transactional write operation) the spin field of the node owned by the writer thread (i.e., thread 5) to allow thread 5 to acquire the reader-writer lock for writing. At this point, thread 5 and only thread 5 holds the lock and can enter critical section.

As previously noted, the TxLock algorithm described by the pseudo code above may be much simpler to implement than the KSUH algorithm and may have the advantage that is does not require nodes to be stored in TSM. However, under heavy contention, it may perform worse than the KSUH algorithm (or corrected versions of the KSUH algorithm). For example, because the TxLock algorithm includes a variable (the Tail variable) that is frequently modified within transactions (e.g., by every lock operation and some unlock operations), performance may suffer under contention even in read-dominated workloads. In other embodiments, an alternate version of the HTM-based reader-writer lock algorithm described above may sacrifice some of the simplicity of the TxLock algorithm in order to improve performance.

In one embodiment, an alternate version of the HTM-based reader-writer lock algorithm described above may avoid situations in which competing threads repeatedly abort each other (with neither making progress) in cases that always modify the Tail variable (e.g., in the writerLock and reader- Lock procedures), by using non-transactional atomic instructions (such as SWAP type operations or compare-and-swap (CAS) type instructions) to modify the Tail variable. In other procedures, transactions may access the Tail variable less frequently (and may thus be vulnerable to conflicts on this variable for shorter periods of time), and/or the procedures may sometimes access Tail without using a transaction. Note that this approach may assume that the hardware transactional memory supports strong atomicity, allowing the Tail variable to be concurrently accessed both by CAS type instructions and within transactions. This alternate version of the HTM-based reader-writer lock algorithm described above is sometimes referred to herein as the "Poison the Tail" algorithm. This algorithm is described below as a series of modifications to the TxLock algorithm, using the writerLock procedure as an example. The complete algorithm is then illustrated by example pseudo code, according to one embodiment.

In the "Poison the Tail" algorithm, the writerLock and readerLock procedures, which always modify Tail, may be modified so that they first "claim" the right to insert the next node by modifying Tail with a non-transactional atomic instruction, and then complete the insertion of the new node using a transaction. To limit the complexity introduced by separating these two steps, any transaction that accesses Tail may be prevented from completing between them. To do so, the "claiming" (which effectively indicates an intent to acquire the lock) may be achieved by changing Tail from a node pointer value to a special value POISON, while recording the replaced pointer value to enable the subsequent transaction to link the new node into the list. Following these changes, the writerLock procedure of the TxLock algorithm may be described by the following example pseudo code:

```
procedure writerLock(Tail, I)
    I→state = WRITER;
    I→spin = 1;
    I→next = NULL;
    while (Tail == POISON || (pred =SWAP(Tail, POISON) == POISON))
        Pause( );
    atomically
        Tail = I;
        if (pred)
            pred→next = I;
    if (pred) while (I→spin) Pause( );
```

As a result of this change, the previous value of Tail may be known before the transaction that links the node to its neighbor(s) in the list is executed. An analogous change in the readerLock procedure may allow the new node's prev field to be initialized before the transaction (as shown in line 27 of the pseudo code below). This is because the node may be "private" until it is linked into the list, and therefore it does not matter if its prev field is set before the node is linked into the list.

In the "Poison the Tail" algorithm, whenever a transaction accesses Tail, it may first determine whether Tail contains the value POISON, and if so, it may retry. In general, the differences between the writerUnlock and readerUnlock procedures of the TxLock algorithm presented above and their counterparts presented below are due to this change. In some embodiments, this change may ensure that when Tail contains the value POISON, it is accessed only by the thread that most recently set it to the value POISON performing its transaction to finish linking in its node. In this way, contention on Tail may be avoided for the transaction that links in the node, while keeping the algorithm simple.

In some embodiments, various transformations of the TxLock algorithm presented above may be used to make transactions smaller, or otherwise more likely to succeed, as well as to replace some transactions with non-transactional accesses, thus avoiding the overhead of a executing (and possibly retrying) a transaction, in some cases. For example, in some cases the path taken through a transaction can be determined by local variables, and properties of this path can be exploited by factoring the path out into its own transaction. In one specific example, the transaction in the pseudo code for the writerLock procedure presented above may be replaced with the following pseudo code:

```
if (pred)
    atomically
        Tail = I;
        pred→next = I;
else
    atomically
        Tail = I;
```

In some embodiments, this transformation may allow the separate transactions to be optimized independently. Furthermore, eliminating conditional branches within transactions may be beneficial in systems that include hardware transactional memory that can fail due to misspeculation.

In some embodiments, another transformation that can be applied to the TxLock algorithm moves an assignment to Tail to the end of the transaction. This transformation does not change the net effect of the transaction, and other threads will not observe partial effects of the transaction. Therefore, the order in which updates happen within the transaction will not affect the correctness of the algorithm. However, this transformation may reduce the time a transaction spends after modifying Tail and before committing, thus reducing the likelihood of such transactions aborting due to contention on Tail. Furthermore, a transaction that will access only a single shared variable (such as the one in the else clause above) may in some embodiments be replaced by code that performs this access non-transactionally. Applying these two changes to the transaction shown above may yield the following pseudo code:

```
if (pred)
    atomically
        pred→next = I;
        Tail = I;
else
    Tail = I;
```

Note that many of the transformations described above may be easily seen to preserve the semantics of the algorithm, and may be performed automatically, for example by an optimizing compiler. However, performing other transformations, including the two example transformations described below, may require some knowledge of the algorithm.

In the first example, after Tail is set to POISON by a given thread, no transaction accesses Tail until he given thread updates Tail to a non-POISON value. For this reason, it is not important that the given thread's update to Tail be performed atomically with the transaction that links in the given thread's node. Instead, this access may be performed non-transactionally after that transaction commits. This may allow the code to be refactored so that the assignment to Tail is performed non-transactionally, regardless of whether or not pred is non-NULL. Furthermore, this change may result in a transaction that accesses only a single shared variable. Therefore this access too may be performed non-transactionally. As a result of all of these changes, there may no longer be a transaction in the writerLock procedure of the "Poison the Tail" algorithm, as shown below.

It is noted that some care is required in applying some of these optimizations, especially those that make transactional accesses non-transactional, because of issues related to the memory consistency model. In some embodiments in which the target platform supports a Total Store Ordering (TSO) consistency model, there may be no need to insert any additional memory fence instructions due to the transformations that have been applied to yield the example pseudo code below. However, this is not guaranteed to be the case for all platforms. Therefore, in some embodiments, memory fence instructions appropriate to the target platform may be applied.

```
1       procedure writerLock(Tail, I)
2           I→state = WRITER;
3           I→spin = 1;
4           I→next = NULL;
5           while (Tail == POISON || (pred = SWAP(Tail, POISON)) == POISON)
6               Pause( );
7           if (pred) pred→next = I;
8           Tail = I;
9           if (pred) while (I→spin) Pause( );
10
11      procedure writerUnlock(Tail, I);
12          atomically
13              next = I→next;
14              if (!next)
15                  if (Tail == POISON) retry;
16                  Tail = NULL;
17              else
18                  next→prev = NULL;
19              if (next) next→spin = 0;
20
21      procedure readerLock(Tail, I)
22          I→state = READER;
23          I→spin = 1;
24          I→next = I→prev = NULL;
25          while (Tail == POISON || (pred = SWAP(Tail, POISON))== POISON)
26              Pause( );
27          I→prev = pred;
28          if (pred)
29              atomically
30                  pred→next = I;
31                  predState = pred→state;
32          Tail = I;
33          if (pred != NULL && predState != ACTIVE_READER)
34              while (I→spin) Pause( );
35          atomically
36              I→state = ACTIVE_READER;
37              next = I→next;
38              if (next && next→state == READER)
39                  next→spin = 0;
40
41      procedure readerUnlock(Tail, I)
42          succState = UNDEF_STATE;
43          atomically
44              pred = I→prev;
45              next = I→next;
46              if (pred) pred→next = next;
47              if (next)
48                  next→prev = pred;
49              if (!pred)
50                  succState = next→state;
51              else
52                  if (Tail == POISON) retry;
53                  Tail = pred;
54          if (succState == WRITER) next→spin = 0;
```

Figure 8:
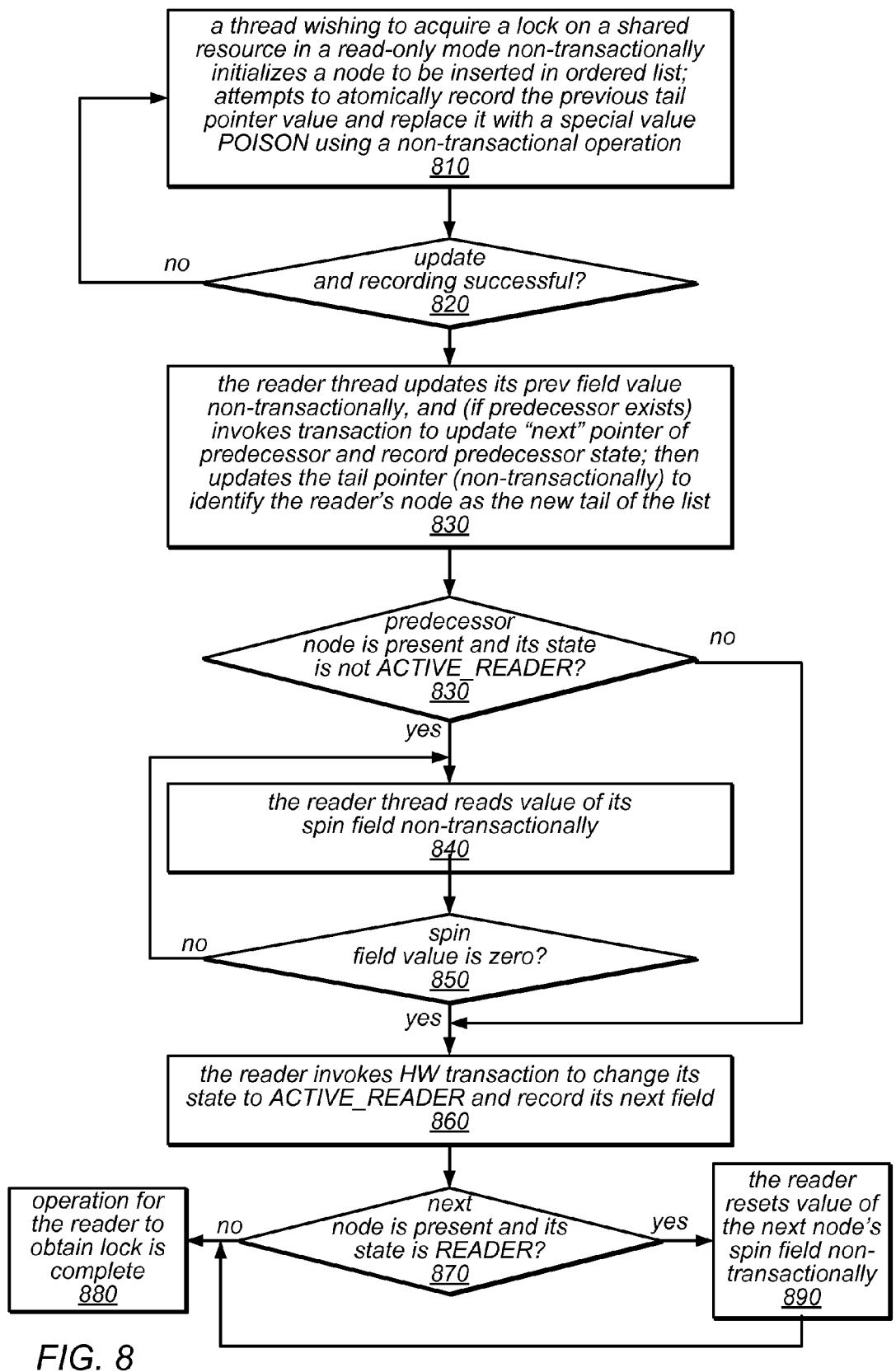
FIG. 8 is a flow diagram illustrating another embodiment of a method for a reader thread to acquire a reader-writer lock.

The "Poison the Tail" algorithm for implementing an HTM-based reader-writer lock may be further illustrated by the flow diagrams in FIGS. 8-11, according to one embodiment. For example, one embodiment of the alternate method described above for a reader thread to acquire a reader-writer lock is illustrated by the flow diagram in FIG. 8. The operations illustrated in FIG. 8 may be performed directly by the reader thread or by a method, function, or procedure (e.g., the readerLock procedure of the "Poison the Tail" algorithm described above) that is called or invoked by the reader thread, in different embodiments. As illustrated at 810, in this example, the method may include a thread that wishes to acquire a lock on a shared resource in a read-only mode non-transactionally initializing a node to be inserted in an ordered list of client-provided nodes that make up a reader-writer lock structure; and attempting to atomically record the current value of a tail pointer for the lock structure and replace it with a special value of POISON using a non-transactional operation (e.g., a CAS type operation). In this example, initializing the node may include setting the prev and next fields of the new node to NULL values. If one or more of these operations is unsuccessful (shown as the negative exit from 820), the method may include repeating one or more of them until they are successful. This is illustrated in FIG. 8 by the feedback from the negative exit of 820 to 810.

Once the operations illustrated at 810 have been successfully completed (shown as the positive exit from 820), the method may include the reader thread updating the prev field value (non-transactionally) of the newly inserted node to identify the node immediately preceding the newly inserted node; invoking a transaction to update a pointer from its predecessor node and record the predecessor's state (if a predecessor node exists); and then updating the tail pointer (non-transactionally) to identify the reader's node as the new tail of the list, as in 830. If a predecessor node is present and its state is not ACTIVE_READER (shown as the positive exit from 830), the method may include the reader thread reading the value of its spin field non-transactionally, as in 840. If the spin field value is non-zero (shown as the negative exit from 850), the method may include the reader thread spinning on the spin field value until the thread that owns the predecessor node resets the spin field value of the new node to zero to indicate that the owner of the new node can proceed to acquire the reader-writer lock in a read-only mode. This is illustrated in FIG. 8 by the feedback from the negative exit of 850 to 840.

In this example if there is no predecessor node (i.e., if the newly inserted node is the first and only node in the list), if the predecessor node's state is ACTIVE_READER, or once the spin field value of the newly inserted node is zero (shown as the positive exit from 850), the method may include the reader invoking a hardware transaction to change its state to ACTIVE_READER and record the value of its node's next field, as in 860. At this point, the reader thread may be able to access the shared resource for reading. In this example, if a successor node is not present (e.g., if the recorded value of the newly inserted node's next field is NULL), or the value of the state field of such a successor node is not READER (shown as the negative exit from 870), the operation for the reader to obtain the lock may be complete (as in 880). However, if a successor node is present (e.g., if the recorded value of the newly inserted node's next field is non-NULL), and the value of its state field is READER (shown as the positive exit from 870), the method may include the reader thread resetting the value of the successor node's spin field non-transactionally (as in 890), after which the operation for the reader to obtain the lock may be complete (as in 880). In this example, resetting the value of the successor node's spin field may allow the reader thread that owns the successor node to access the shared resource in read-only mode, as well.

Figure 9:
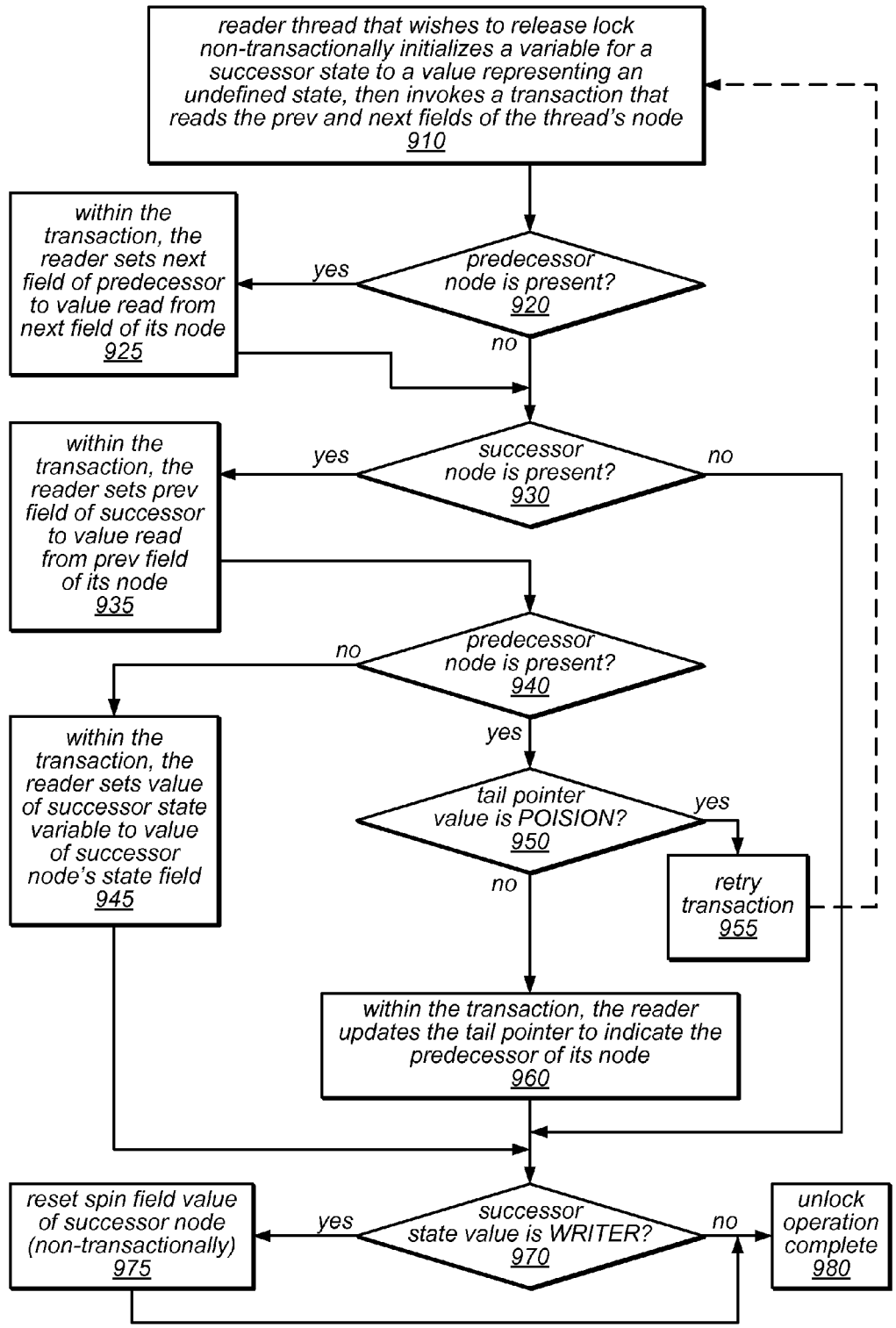
FIG. 9 is a flow diagram illustrating another embodiment of a method for a reader thread to release a reader-writer lock.

The alternate method described above for a reader thread to release a reader-writer lock is further illustrated by the flow diagram in FIG. 9, according to one embodiment. The operations illustrated in FIG. 9 may be performed directly by the reader thread or by a method, function, or procedure (e.g., the readerUnlock procedure of the "Poison the Tail" algorithm described above) that is called or invoked by the reader thread, in different embodiments. As illustrated at 910, in this example, the method may include a reader thread that wishes to release an HTM-based reader-writer lock non-transactionally initializing a variable for a successor state to a value representing an undefined state, and invoking a transaction that reads (and records) the prev and next fields of a node (e.g., a node that is owned by the reader thread) in an ordered list of client-provided nodes that make up a reader-writer lock structure. In this example, if there is a predecessor node present (shown as the positive exit from 920), the method may include the reader thread (within the transaction), setting the next field of the predecessor to the value that was previously read from the next field of its own node (i.e. the reader thread's node), as in 925. In this example, determining whether or not there is a predecessor node present may include the reader thread reading (within the transaction) the previously recorded value of its prev field. If there is not a predecessor node present (i.e., if the reader thread's node is at the head of the list), the operation at 925 may be skipped.

As illustrated in this example, if there is a successor node present (shown as the positive exit from 930), the method may include the reader thread (within the transaction) setting the prev field of the successor to the value that was previously read from the prev field of its own node, as in 935. In this example, determining whether or not there is a successor node present may include the reader thread reading (within the transaction) the previously recorded value of its next field. If there is not a successor node present (i.e., if the reader thread's node is at the tail of the list and the previously recorded value of its next field is NULL), the operation at 935 may be skipped. In this example, if there is a successor node present, but there is not a predecessor node present (shown as the negative exit from 940), the method may include the reader thread (within within the transaction) setting the value of the successor state variable to the value of the successor node's state field, as in 945. In this example, the reader thread may read the value of the successor node's state field within the transaction. On the other hand, if there is a successor node present, and there is a predecessor node present (shown as the positive exit from 940), the method may include the reader thread (within the transaction) determining whether or not the value of the tail pointer is POISON, and if so, retrying the transaction. This is illustrated in FIG. 9 by the path from the positive exit from 950 to 955 and the dashed line from 955 to 910. If the tail pointer value is not POISON, shown as the negative exit from 950, the method may include the reader thread (within the transaction) updating the tail pointer to identify the predecessor of its own node as the new tail of the list, as in 960. At this point, the reader thread's node has been removed from the list.

As illustrated in this example, if the value of the successor state variable is not WRITER (shown as the negative exit from 970), the unlock operation may be complete (as in 980). If the value of the successor state variable is WRITER (shown as the positive exit from 970), the method may include the reader thread resetting the spin field value of its successor node (non-transactionally), as in 975, after which the unlock operation may be complete, as in 980. In this example, resetting the spin field value of the successor node may be performed by the reader thread using non-transactional accesses.

As in previous examples, resetting the spin field value of the successor node may allow the writer thread that owns the successor node to access the shared resource that is protected by the reader-writer lock for writing. Note that, as described herein, once the reader thread's node has been removed from the list, it may be freed by the application. For example, the memory allocated to the node may be returned to the operating system for subsequent reuse by the application or by another application, in different embodiments.

Figure 10:
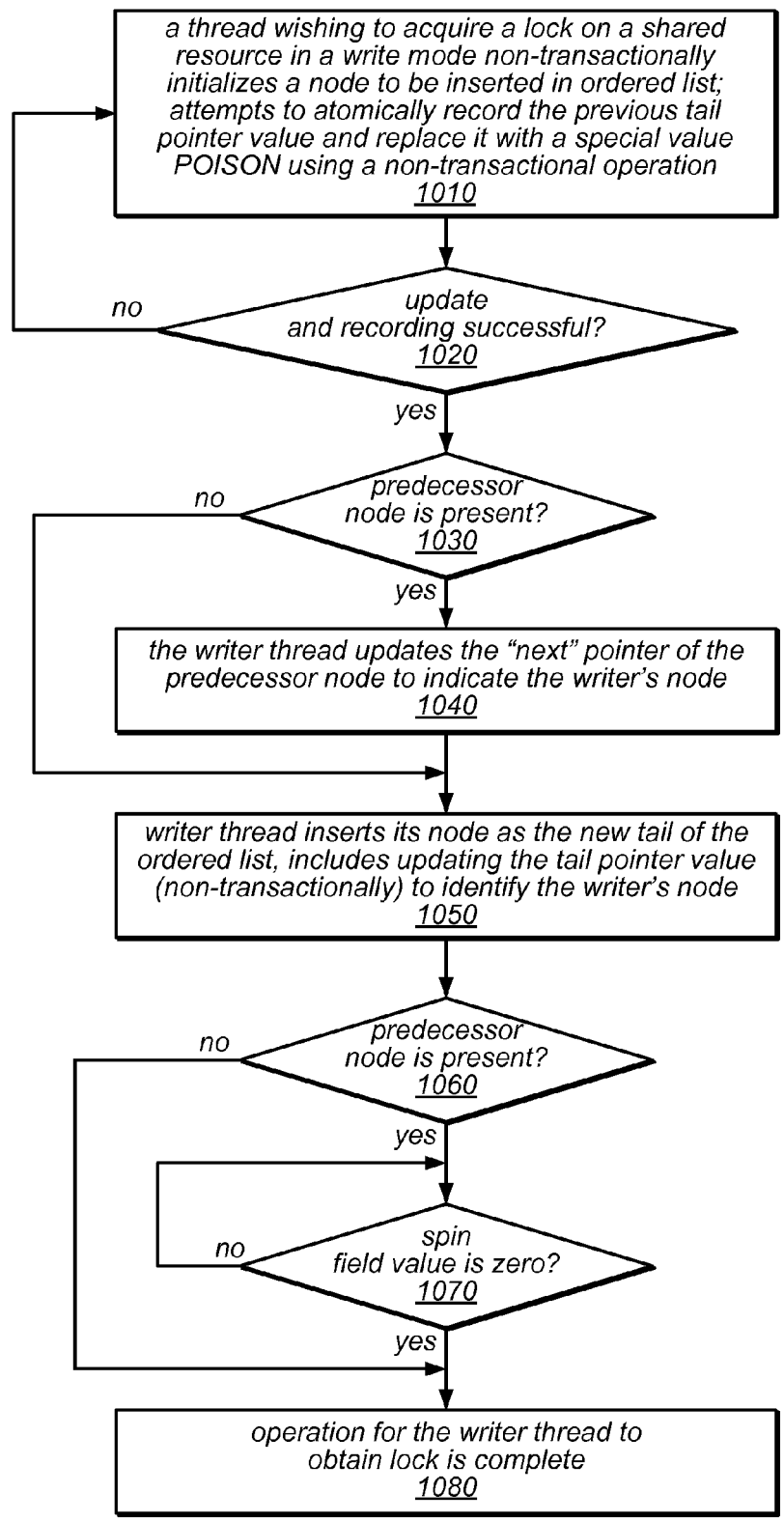
FIG. 10 is a flow diagram illustrating another embodiment of a method for a writer thread to acquire a reader-writer lock.

The alternate method described above for a writer thread to acquire a reader-writer lock is further illustrated by the flow diagram in FIG. 10, according to one embodiment. The operations illustrated in FIG. 10 may be performed directly by the writer thread or by a method, function, or procedure (e.g., the writerLock procedure of the "Poison the Tail" algorithm described above) that is called or invoked by the writer thread, in different embodiments. As illustrated at 1010, in this example, the method may include a thread that wishes to acquire a lock on a shared resource in a write mode initializing a node to be inserted in an ordered list of client-provided nodes that make up a reader-writer lock structure (using non-transactional accesses); and attempting to atomically record the current value of a tail pointer for the lock structure and replace it with a special value of POISON using a non-transactional operation (e.g., a CAS type operation). If one or more of these operations is unsuccessful (shown as the negative exit from 1020), the method may include repeating one or more of them until they are successful. This is illustrated in FIG. 10 by the feedback from the negative exit of 1020 to 1010.

Once the operations illustrated at 1010 have been successfully completed (shown as the positive exit from 1020), the method may include determining whether or not a predecessor node is present, as in 1030, which may include the writer thread using the previously recorded value of the tail pointer. If there is a predecessor node (shown as the positive exit from 1030), the method may include the writer thread updating the next pointer of the predecessor node to indicate that the writer's node succeeds it in the list (as in 1040) using a non-transactional write access. If there is no predecessor node (e.g., if the previously recorded value of the tail pointer is NULL), the operation illustrated at 1040 may be skipped.

As illustrated in this example, the method may include the writer thread inserting its node as the new tail of the ordered list (as in 1050), e.g., by updating the tail pointer value to identify the new node using a non-transactional write access. In addition, if a predecessor node is present (shown as the positive exit from 1060) the method may include the writer thread reading the value of the spin field of its own node non-transactionally, as in 1070. If the spin field value is non-zero (shown as the negative exit from 1070), the method may include the writer thread spinning on the spin field value until the predecessor node resets the spin field value of the new node to zero to indicate that it can proceed to acquire the reader-writer lock in a write mode. This is illustrated in FIG. 10 by the feedback from the negative exit of 1070 to 1070.

In this example if there is no predecessor node (i.e., if the newly inserted node is the first and only node in the list), or once the spin field value of the newly inserted node is zero (shown as the positive exit from 1070), the operation for the writer thread to obtain the reader-writer lock may be complete, as in 1080. At this point, the writer thread may access the shared resource that is protected by the reader-writer lock for writing. As illustrated in FIG. 10 and described above, none of the accesses to the reader-writer lock structure or the tail pointer in the writerLock procedure of the "Poison the Tail" algorithm need to be performed within a transaction.

Figure 11:
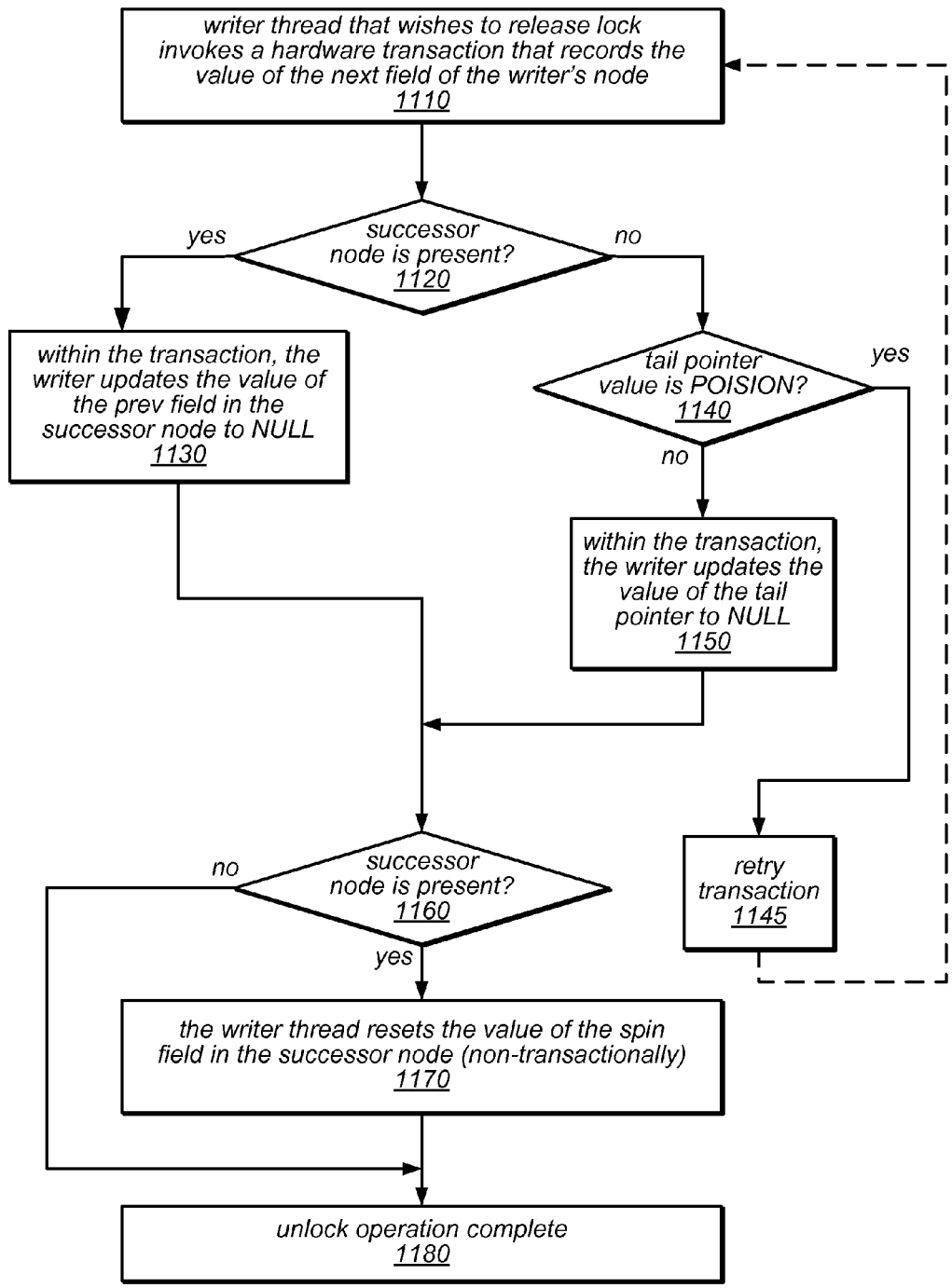
FIG. 11 is a flow diagram illustrating another embodiment of a method for a writer thread to release a reader-writer lock.

The alternate method described above for a writer thread to release a reader-writer lock is further illustrated by the flow diagram in FIG. 11, according to one embodiment. The operations illustrated in FIG. 11 may be performed directly by the writer thread or by a method, function, or procedure (e.g., the writerUnlock procedure of the "Poison the Tail" algorithm described above) that is called or invoked by the writer thread, in different embodiments. As illustrated at 1110, in this example, the method may include a writer thread that wishes to release a reader-writer lock invoking a hardware transaction that records the value of the next field of the writer's node. If a successor node is present (shown as the positive exit from 1120), the method may include the writer thread (within the transaction) updating the value of the prev field in the successor node to NULL, as in 1130, to unlink the node from the list. In this example, determining whether or not there is a successor node present may include the writer thread (within the transaction) using the recorded value of the next field of its node.

As illustrated in this example, if there is not a successor node present (e.g., if the node is the only node in the list and the recorded value of the next field of the writer's node is a NULL value), the method may include determining whether the value of the tail pointer is a special POISON value (as in 1140), and if so, the writer thread retrying the transaction, as in 1145. This is illustrated in FIG. 11 by the dashed line from 1145 to 1110. In this example, determining whether the value of the tail pointer is POISON may include the writer thread (within the transaction) reading the Tail variable. If the tail pointer value is not POISON (shown as the negative exit from 1140), the method may include the writer thread (within the transaction) updating the value of the tail pointer to NULL, as in 1150. At this point the writer's node is removed from the list and unlinked from any successor node that is present.

As illustrated in this example, after the writer's node is removed from the list, if there is not a successor node present (shown as the negative exit from 1160), the unlock operation may be complete (as in 1180). However, if there is a successor node present (shown as the positive exit from 1160), the method may include the writer thread resetting the value of the spin field in the successor node (as in 1170) using a non-transactional write access (i.e., outside of the transaction that performs the operations illustrated in 1110-1150). In this example, determining whether a successor node is present (at 1160) may include using the previously recorded value of the writer node's next field, after which the unlock operation may be complete (as in 1180). Note that, as described herein, once the writer thread's node has been removed from the list, it may be freed by the application. For example, the memory allocated to the node may be returned to the operating system for subsequent reuse by the application or by another application, in different embodiments.

Note that in an application that invokes the lock and unlock procedures of the "Poison the Tail" reader-writer lock algorithm described above, the results of those procedures may be substantially the same as the results of the corresponding lock and unlock procedures of the TxLock algorithm. In other words, although the underlying operations performed by the lock and unlock procedures may be different under these two algorithms (e.g., based on the application of one or more of the transformations and optimizations described herein), their eventual effects on an ordered list of client-provided nodes that make up a reader-writer lock may be substantially the same. Therefore, the block diagrams illustrated in FIGS. 7A-7K may accurately reflect the state of each of the nodes 710a-710e of such an ordered list when the lock and unlock procedures of the "Poison the Tail" algorithm are invoked instead of the corresponding procedures of the TxLock algorithm. However, the effects of the lock and unlock procedures of the "Poison the Tail" algorithm on the value of tail pointer 715 are not accurately reflected in these figures, since the TxLock algorithm does not employ the special POISON value to first claim the right to insert a new node prior to actually inserting it.

As previously noted, best effort hardware transactional memory implementations may not be guaranteed to be able to commit transactions. Therefore, threads can in some cases starve, even if they are running alone. In some embodiments, this issue may be addressed by using Transactional Lock Elision (TLE), whereby a thread that repeatedly fails to commit a transaction acquires a mutual exclusion lock, and then executes the code of its transaction non-transactionally. In such embodiments, in order to preserve correctness, all transactions may be modified so that they cannot commit when the mutual exclusion lock is held. An evaluation in which TLE was added to the transactional RW-lock (TxLock) algorithm described herein confirmed that the overhead for adding TLE was relatively low. Note, however, that some of the optimizations that have been explored to reduce contention may not be compatible with the simple TLE technique for ensuring progress. While similar, but algorithm-specific, techniques may be used to accommodate at least one such optimization, doing so in general may quickly complicate the algorithm, thereby at least partially defeating the purpose of using HTM in the first place.

It has been observed that it is sometimes possible to make transactions more likely to succeed in a system that includes best-effort HTM by prefetching some variables to be accessed in the transaction before starting the transaction. In some embodiments, this technique may be applied to the HTM-based reader-writer lock algorithms described herein. For example, the Tail variable may be prefetched before retrying transactions that will access it. More specifically, in some embodiments, the Tail variable may prefetched unconditionally before retrying transactions that always access Tail, and conditionally before retrying transactions that conditionally access Tail.

Another technique that may be applied to the HTM-based reader-writer lock algorithms described herein, in some embodiments, may be referred to as a "shortcut transaction." With this technique, a transaction is preceded with a short transaction that applies the same effects as the original transaction in a case that is expected to be common, so it can be optimized for that case, while having no effect in other cases. When the common case occurs, the original transaction need not be executed. Even when the common case is not encountered, the shortcut transaction may serve to prefetch some of the variables to be accessed when the original transaction is executed. In one example, the following shortcut transaction may be at the beginning of the readerUnlock procedure:

```
atomically
    pred = I→prev;
    next = I→next;
    if (pred && next)
        next→prev = pred;
        pred→next = next;
    if (pred && next) return;
```

Another optimization that may be applied to the HTM-based reader-writer lock algorithms described herein is the use of a CAS-based writerUnlock procedure. For example, in some embodiments, a CAS type atomic instruction may be used to modify Tail in the writerUnlock procedure of TxLock, as is done for the writerLock and readerLock procedures in the "Poison the Tail" algorithm. This may serve to reduce contention on Tail and the number of retries resulting from such contention. In one embodiment, the writerUnlock procedure includes following code.

```
procedure writerUnlock(Tail, I)
    next = I→next;
    if (!next) {
        if (CAS (Tail, I, NULL)) return;
    next→prev = NULL;
    next→spin = 0;
```

Note that the correctness of this version may be dependent on knowledge of the algorithm. In particular, when a writer is releasing the lock, its node has no predecessor. This is because if a predecessor existed, it was removed before the writer entered the critical section. If the node's next field value is NULL, then it also has no successor. In this case, removing the writer's node from the list may simply amount to setting Tail to NULL. However, because the read of the node's next field and the update of Tail are not guaranteed to be atomic, the algorithm must allow for the possibility that Tail no longer points to the node that is to be removed when Tail is modified. In some embodiments, for this reason, a CAS instruction may be used to set Tail to NULL only if it still points to the node being removed. If the CAS instruction succeeds, then there is no subsequent node to be released, and the unlock operation is complete. If the CAS fails, on the other hand, then another node has been inserted into the list, and the node being removed is no longer the last node in the list. In this example, because the new node was inserted using a transaction, the next field of the node being removed is already set, so there is no need to wait for it to be set, as is the case in the KSUH algorithm. In this case, just as if the node to be removed had not been the last node when its next field was first read, the unlocking thread may simply unlink its node by setting the successor node's prev field to NULL, and then releasing the thread that is spinning on that node. In some embodiments, these operations may be performed with simple non-transactional write operations (stores) because only the writer thread that is releasing the lock can access these fields until the next thread is released. Note that, in this example, it is important that these stores happen in the order shown above, because if the owner of the successor node enters the critical section, it may subsequently leave and remove its node before the store to its prev field occurs.

Figure 12:
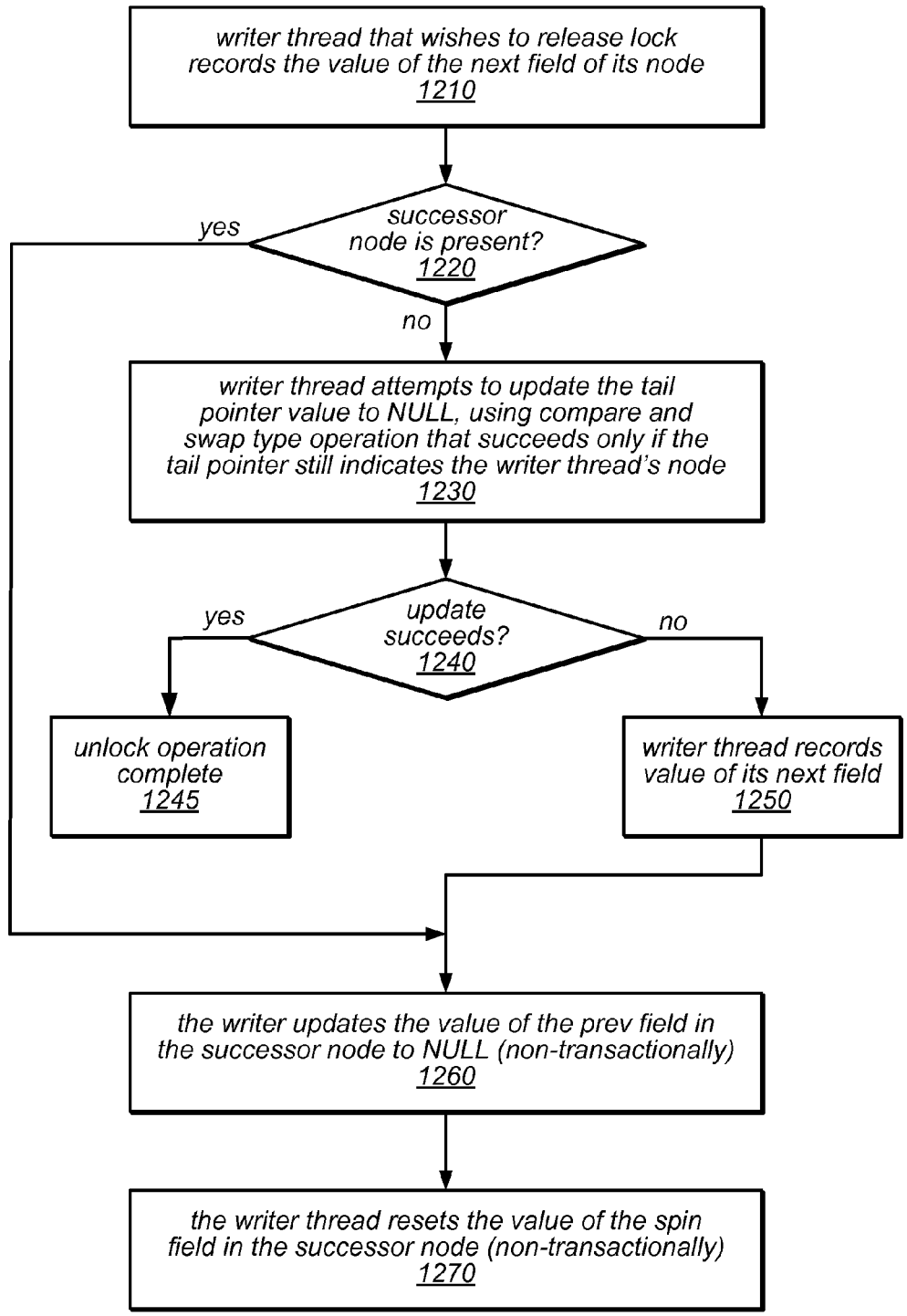
FIG. 12 is a flow diagram illustrating one embodiment of a method for a writer thread to release a reader-writer lock that uses a compare-and-swap type operation.

One embodiment of a method for a writer thread to release a reader-writer lock using a compare-and-swap type operation, as described above, is illustrated by the flow diagram in FIG. 12. The operations illustrated in FIG. 12 may be performed directly by the writer thread or by a method, function, or procedure (e.g., the modified writerUnlock procedure described above) that is called or invoked by the writer thread, in different embodiments. As illustrated at 1210, in this example, the method may include a writer thread that wishes to release a reader-lock lock recording the value of the next field of its own node. If a successor node is not present, shown as the negative exit from 1220, the method may include the writer thread attempting to update the tail pointer value for the reader-writer lock to a NULL, value using a compare and swap type operation that succeeds only if the tail pointer still identifies the writer thread's node as the tail of the list (as in 1230). In this example, determining whether a successor node is present may include using the recorded value of the next field of the writer's node. If the update succeeds (shown as the positive exit from 1240), the unlock operation may be complete, as in 1245.

In this example, if the update does not succeed (e.g., if the tail pointer value indicates that another node has since become the tail of the list), the method may include the writer thread recording the current value of the next field of its own node (as in 1250). If there is a successor node (shown as the positive exit from 1220 or the negative exit from 1240), the method may include the writer thread updating the value of the prev field in the successor node to a NULL value using a non-transactional write operation, as in 1260. In this case, the method may also include the writer thread resetting the value of the spin field in the successor node using a non-transactional write operation, as in 1270. As in previous examples, resetting the value of the spin field in the successor node may allow the thread that owns the successor node to acquire the reader-writer lock and access the critical section of code or shared resource that is protected by the reader-writer lock.

In some embodiments, although this change may make the HTM-based reader-writer lock algorithm and correctness argument somewhat more complicated, the modified algorithm (which may be referred to as the TxLock+CAS algorithm) may still be considerably simpler and easier to reason about than the KSUH algorithm, and it may retain the advantage that it does not require TSM for nodes. In another embodiment, a similar modification may be made to the "Poison the Tail" algorithm. In such an embodiment, if the CAS fails, the writerUnlock procedure may need to wait until the next field value is not NULL, because a writer thread may be poised to perform the write (e.g., at line 7 in the pseudo code for the "Poison the Tail" algorithm presented above). In some embodiments, the CAS-based writerUnlock procedure described herein may make a considerable performance difference in work-loads with moderate to high numbers of write operations because it avoids delaying a writer that is attempting to release the lock, which is on the critical path.

As the above discussion shows, there are many possibilities for optimizing HTM-based reader-writer lock algorithms, but using them may make the algorithms more complex. As noted above, some of these possibilities preserve semantics and could be applied by a compiler, while others may be shown to preserve semantics, provided that some simple properties of the algorithm are known. Together, these observations may suggest that a useful strategy for designing HTM-based reader-writer lock algorithms may be to start with simple transactional versions with relatively large transactions, and to then to apply transformations in a disciplined and perhaps (at least partially) automated way.

As noted above, the TLE technique aims to achieve reasonable progress properties for algorithms that use best-effort HTM, which do not guarantee to be able to commit transactions. In some embodiments, to apply this technique, transactions may be augmented so that they read a field of the lock structure and verify that it is not held before committing the rest of the transaction. This way, an operation that is unable to make progress by committing its transaction can give up trying, acquire the lock using mutual exclusion, and perform its operation non-transactionally. In such embodiments, because all transactions check the lock to ensure they do not commit while the lock is held, this approach may preserve the semantics of the transaction while overcoming the weak progress guarantees made by best-effort HTM. In one evaluation, this TLE technique has been added to the TxLock algorithm described herein, resulting in an algorithm referred to as the TxLock+TLE algorithm.

Again note that TLE is not compatible with all of the variations and optimizations of the HTM-based reader-writer lock algorithms described herein. In particular, for algorithms that mix transactions with non-transactional atomic operations such as CAS (e.g., the TxLock+CAS algorithm and all variants of the "Poison the Tail" algorithm), there may not be an effective way to prevent the instructions from taking effect while the lock is held. Therefore, the algorithm cannot ensure that transactions executed while holding the lock are atomic with respect to these operations. Consequently, enhancing an algorithm's progress properties by using TLE precludes the use of some optimizations that may otherwise be valuable. However, if a processor that supported HTM were to provide variants of simple synchronization operations (such as CAS) that are able to confirm the expected value of a separate memory location and are as fast as the underlying operation (CAS, in this case), these optimizations may be applied while employing TLE for progress, in some embodiments.

Figure 13:
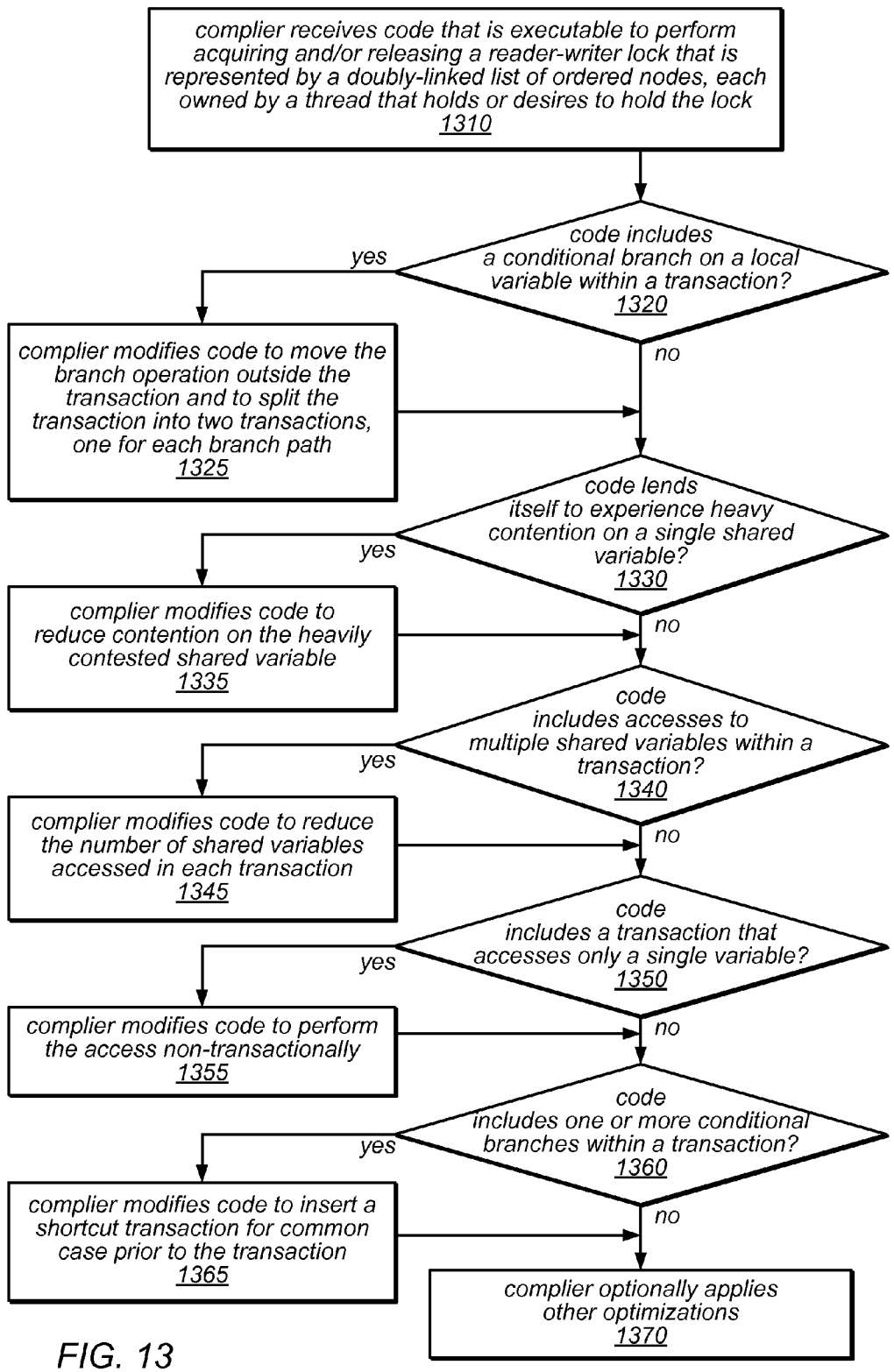
FIG. 13 is a flow diagram illustrating one embodiment of a method for modifying code for acquiring and/or releasing a reader-writer lock.

One embodiment of a method for modifying code for acquiring and/or releasing a reader-writer lock is illustrated by the flow diagram in FIG. 13. As illustrated in this example, one or more code optimizations (including, but not limited to, those described above) may be applied by a compiler to simplify and/or improve the performance of applications in which critical sections and/or shared resources are protected by reader-writer locks, including some of the reader-writer locks described herein. Note that in various embodiments, rather than being applied automatically by a compiler, one or more of these optimizations (as well as other optimizations that require specific knowledge of the lock and unlock procedures of a given reader-writer lock algorithm) may be applied by the developer of the procedures that make up the reader-writer lock algorithm prior to them being compiled.

As illustrated at 1310, in this example, the method may include a complier (e.g., an optimizing compiler) receiving code that is executable to perform acquiring and/or releasing a reader-writer lock that is represented by a doubly-linked list of ordered nodes, each owned by a thread that holds or desires to hold the lock. In this example, if the code includes a conditional branch on a local variable within a transaction (shown as the positive exit from 1320), the method may include the complier modifying the code to move the branch operation outside the transaction and to split the transaction into two transactions, one for each branch path, as in 1325. Note that this transformation may yield a correct result if the local variable is not assigned a value within the transaction that is based on other values read within the transaction. In this example, if the code lends itself to the possibility to experience heavy contention on a single shared variable (shown as the positive exit from 1330), the method may include the compiler modifying the code to reduce contention on the heavily contested shared variable (e.g., using one or more of the techniques described herein or another type of transformation), as in 1335.

As illustrated in this example, if the code includes accesses to multiple shared variables within a single transaction (shown as the positive exit from 1340), the method may include the complier modifying the code to reduce the number of shared variables accessed in each transaction (as in 1345). Conversely, if the code includes a transaction that accesses only a single variable (shown as the positive exit from 1350), the method may include the complier modifying the code to perform the access non-transactionally, as in 1355.

As illustrated in FIG. 13, if the code includes one or more conditional branches within a transaction (shown as the positive exit from 1360), the method may include the complier modifying the code to insert a shortcut transaction for the common case prior to the transaction (as in 1365). In some embodiments, in addition to performing any of the transformations depicted in FIG. 13, the method may include the complier optionally and/or conditionally applying one or more other code optimizations (e.g., other optimizations that may simplify the code or its use, improve the performance of applications that include the code, and/or improve progress properties of the transactions within the code), as in 1370.

While many of the examples included herein describe the use of HTM to simplify and improve reader-writer lock algorithms, in other embodiments, reader-writer lock algorithms may be simplified and improved using techniques that do not depend on HTM. For example, some reader-writer lock algorithms that have been described in the literature since the KSUH algorithm was published deliver significantly better scalability than the KSUH algorithm. In some embodiments, the bug identified in the KSUH algorithm may be corrected without depending on HTM. In other embodiments, if it is not possible or desirable to modify the implementation of the KSUH algorithm, it may be possible that the algorithm will behave correctly if the client separates nodes into two different TSM domains: one for read requests and one for write requests. This may ensure that the problematic late store described herein would only ever target nodes used for read requests, so that the prev field that is overwritten by the late store may be used only in nodes used for read requests. For example, the locking protocol used by readers for node removal may avoid the bug occurring in this case, whereas if the late store targets a node that is reused for a write request, the KSUH bug previously described can occur. In some embodiments, this may also allow for an optimization in which the state field is written once when a node is allocated, allowing the initialization of the field during each request to be elided, but this would require the KSUH implementation to be modified.

The alternate solutions for improving the KSUH algorithm described above (e.g., those that do not depend on HTM) may not change the fact that nodes must be kept in TSM, which again imposes considerable inconveniences on programmers. However, in a corrected version of the KSUH algorithm, the only reason TSM is still required may be because the per-node locks of that algorithm are stored in nodes, and could be accessed after a node has been removed. In some embodiments, various techniques may be used to remove this dependence. For example, rather than having a lock per node, there may be a persistent array of locks, and the lock and unlock procedures may hash nodes into the array to determine which lock protects a node. In such an embodiment, care must be taken to avoid deadlock, because the hashing loses the properties that ensure deadlock does not arise in KSUH. In one example, if a thread's attempt to acquire the lock to which its own node hashes times out, it can release the lock on its predecessor and retry. In some embodiments, a more direct solution may involve the use of software transactional memory (STM) to implement the TxLock algorithm. In such embodiments, by using a privatization-safe STM, a solution may be achieved that does not require nodes to be kept in TSM.

As described herein hardware transactional memory (HTM) may be leveraged to simplify and improve synchronization algorithms, such as those employed in the implementation of a reader-writer lock. For example, it has been shown that HTM may be leveraged to significantly simplify a well-known synchronization algorithm, while correcting an error in it that apparently escaped notice for decades. The resulting algorithm is dramatically easier to prove correct, and furthermore eliminates usage constraints that apply to the original algorithm, making it more convenient to use, and improving its space requirements. It has also been shown that optimized versions of this algorithm may employ transformations that make transactions shorter, and in some cases, eliminate them entirely. In evaluations using a processor that supports HTM, the HTM-based algorithms described herein performed competitively with the original algorithm under reasonable conditions. However, the transactional algorithms were not as competitive under extreme contention. In some embodiments, using Transactional Lock Elision (TLE) to enhance the algorithm's progress properties precluded the use of other valuable optimizations. Several other fixes and workarounds for the original algorithm that do not depend on HTM are also described herein, according to various embodiments.

In some embodiments, the definitions and invariants that follow may be assumed. First, it may be assumed that memory used by the reader-writer lock operations, including shared memory, is not modified except as specified by the lock and unlock procedures. In addition, it may be assumed that clients obey the following well-formedness conditions:

A thread that has invoked an operation on a reader-writer lock does not take any steps other than those specified by the operation's procedure until the operation completes.

Each thread alternates between invoking lock and unlock operations, beginning with a lock operation, and each unlock operation matches the immediately preceding lock operation. More precisely:

A thread does not invoke an unlock operation unless it has invoked a lock operation and has not subsequently invoked an unlock operation.

After a lock operation, the next lock or unlock operation invoked (if any) is the matching unlock operation by the same thread.

The node passed to an unlock operation is the same node passed to its matching (i.e., the immediately preceding) lock operation by the same thread.

The node passed to a lock operation must not be the node passed to any preceding lock operation (by another thread) unless the unlock operation matching that lock operation has completed.

A thread may be said to be "idle" if it has not invoked a lock operation, or if it has completed the unlock operation matching its most recent lock operation. A thread may be said to be in its critical section if it has not invoked an unlock operation since it completed its most recent lock operation. A thread in its critical section is in a read-only mode or in a write mode depending on whether its most recently completed operation was a readerLock procedure or a writerLock procedure. A thread is said to own a node if it has invoked a lock operation on that node and has not completed the matching unlock operation. It follows from these definitions that a thread owns a node if and only if it is not idle.

Figure 14:
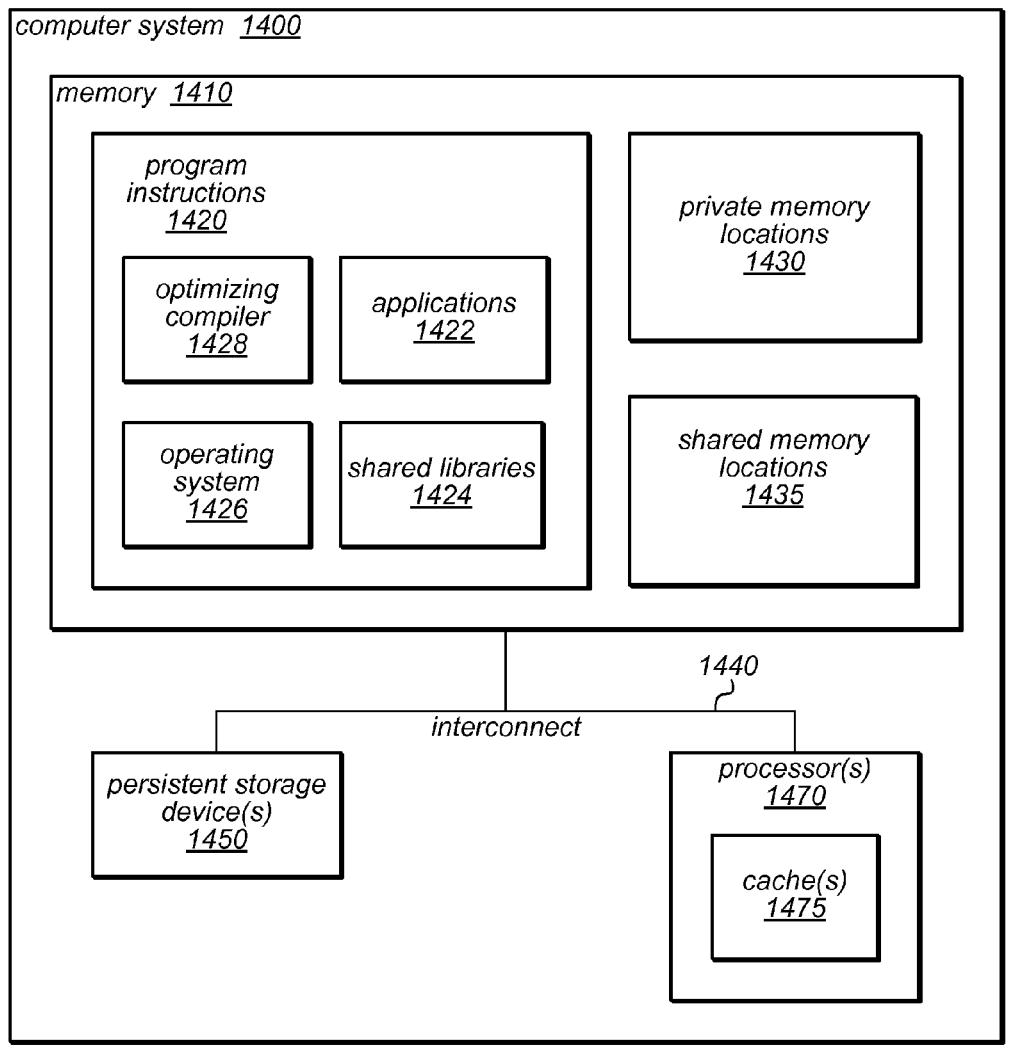
FIG. 14 is a block diagram illustrating a computing system configured to implement a reader-writer lock and/or various methods for acquiring and releasing such a lock, according to various embodiments.

The techniques described herein for providing reader-writer locks may be implemented on or by any of a variety of computing systems, in different embodiments. FIG. 14 illustrates a computing system 1400 that is configured to implement a reader-writer lock and/or various methods for acquiring and releasing such a lock, according to various embodiments. The computer system 1400 may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc, or in general any type of computing device.

The mechanisms for implementing HTM-based reader-writer locks, as described herein, may be provided as a computer program product, or software, that may include a non-transitory, computer-readable storage medium having stored thereon instructions, which may be used to program a computer system 1400 (or other electronic devices) to perform a process according to various embodiments. A computer-readable storage medium may include any mechanism for storing information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, etc.)

In various embodiments, computer system 1400 may include one or more processors 1470; each may include multiple cores, any of which may be single or multithreaded. For example, multiple processor cores may be included in a single processor chip (e.g., a single processor 1470), and multiple processor chips may be included in computer system 1400. Each of the processors 1470 may include a cache or a hierarchy of caches 1475, in various embodiments. For example, each processor chip 1470 may include multiple L1 caches (e.g., one per processor core) and one or more other caches (which may be shared by the processor cores on a single processor). The computer system 1400 may also include one or more persistent storage devices 1450 (e.g. optical storage, magnetic storage, hard drive, tape drive, solid state memory, etc) and one or more system memories 1410 (e.g., one or more of cache, SRAM, DRAM, RDRAM, EDO RAM, DDR 10 RAM, SDRAM, Rambus RAM, EEPROM, etc.). Various embodiments may include fewer or additional components not illustrated in FIG. 14 (e.g., video cards, audio cards, additional network interfaces, peripheral devices, a network interface such as an ATM interface, an Ethernet interface, a Frame Relay interface, etc.)

The one or more processors 1470, the storage device(s) 1450, and the system memory 1410 may be coupled to the system interconnect 1440. One or more of the system memories 1410 may contain program instructions 1420. Program instructions 1420 may be executable to implement one or more applications 1422 (which may include application source code and/or executable application code that includes one or more accesses to a critical section of code or shared resource protected by a HTM-based reader-writer lock, as described herein), shared libraries 1424, or operating systems 1426. In some embodiments, program instructions 1420 may include an optimizing compiler 1428, which may be configured to apply one or more of the transformations and/or optimizations described herein to application or library code that is executable to implement locking and unlocking operations on HTM-based reader-writer locks. In some embodiments, program instructions 1420 may be executable to implement a contention manager (not shown). In some embodiments, program instructions 1420 may also be configured to implement a transaction support library, which provides various methods for implementing atomic transactions (e.g., within shared libraries 1424 or elsewhere within program instructions 1420). In some embodiments, a transaction support library may include functionality to execute transactions according to various hardware and/or software transactional memory techniques. For example, in some embodiments, applications 1422 may make calls into a transaction support library for beginning and ending (i.e., committing) transactions, and/or for performing one or more accesses to shared memory locations 1435 (e.g., locations within a shared transactional memory space) from within transactions.

Program instructions 1420 may be encoded in platform native binary, any interpreted language such as Java™ bytecode, or in any other language such as C/C++, Java™, etc or in any combination thereof. In various embodiments, optimizing compiler 1428, applications 1422, operating system 1426, and/or shared libraries 1424 may each be implemented in any of various programming languages or methods. For example, in one embodiment, optimizing compiler 1428 and operating system 1426 may be JAVA based, while in another embodiment they may be written using the C or C++ programming languages. Similarly, applications 1422 may be written using Java, C, C++, or another programming language, according to various embodiments. Moreover, in some embodiments, optimizing compiler 1428, applications 1422, operating system 1426, and/shared libraries 1424 may not be implemented using the same programming language. For example, applications 1422 may be C++ based, while optimizing compiler 1428 may be developed using C.

The program instructions 1420 may include transactional memory support, locking and/or unlocking functions, operations, or procedures, and/or other processes for implementing HTM-based reader-writer locks, as described herein. Such support and functions may exist in one or more of the shared libraries 1424, operating systems 1426, or applications 1422, in various embodiments. The system memory 1410 may further comprise private memory locations 1430 and/or shared memory locations 1435 where data may be stored. For example, shared memory locations 1435 may include locations in a shared transactional memory space, which may support and/or be accessed by transactions in a software transactional memory implementation, a hardware transactional memory implementation, and/or a hardware-software hybrid transactional memory implementation, in different embodiments. In some embodiments, shared memory locations 1435 may store data or other shared resources that are accessible to multiple, concurrently executing threads, processes, or transactions, and that may be protected by one or more HTM-based reader-writer locks, in various embodiments. In some embodiments, shared memory locations 1435 may store data representing an ordered list of client-provided nodes that make up a reader-writer lock, and/or tail pointer values associated with such locks. In addition, the system memory 1410 and/or any of the caches of processor(s) 1470 may, at various times, store recorded values of local variable and/or various fields of the nodes that make up a reader-writer lock (e.g., in private memory locations 1430), or other lock-related metadata, as described herein, and/or any other data usable in implementing the techniques described herein, some of which may include values that are configurable by the programmer or by a user.

Although the embodiments above have been described in considerable detail, numerous variations and modifications will become apparent to those skilled in the art once the above disclosure is fully appreciated. For example, although many of the embodiments are described in terms of particular types of reader-writer lock structures and particular locking and unlocking procedures, it should be noted that the techniques and mechanisms disclosed herein for implementing HTM-based reader-writer locks may be applicable in other contexts in which critical sections of code and/or shared resources may be protected by other types of locks/structures under different locking algorithms/procedures, or in which HTM-based reader-writer locks are constructed from different types of nodes and other structures than those described in the examples herein. It is intended that the following claims be interpreted to embrace all such variations and modifications.

What is claimed:

1. A method, comprising:
performing, by a computer:
    beginning execution of a multithreaded application that comprises one or more requests to acquire a shared reader-writer lock, wherein the shared reader-writer lock comprises a tail pointer and an ordered list of zero or more nodes, wherein the shared reader-writer lock controls access to a critical section of code or a shared resource by concurrently executing threads of the application;
    a given thread of the application inserting a node in the ordered list of nodes, wherein each node in the ordered list of nodes is owned by a respective thread that holds the shared reader-writer lock or that desires access to the critical section of code or the shared resource in a read-only mode or in a write mode, and wherein only one thread can hold the shared reader-writer lock in a write mode at a time;
    subsequent to said inserting, the given thread acquiring the shared reader-writer lock in a read-only mode or in a write mode; and
    subsequent to said acquiring, the given thread releasing the shared reader-writer lock, wherein said releasing comprises removing the inserted node from the ordered list of nodes;
    wherein at least one of said inserting or said releasing comprises updating a value of the tail pointer within a hardware transaction that employs a hardware transactional memory (HTM), or modifying a field of at least one node in the ordered list of nodes within a hardware transaction that employs the HTM.

2. The method of claim 1, further comprising:
subsequent to said removing the inserted node, freeing memory that was allocated to the inserted node.

3. The method of claim 1, wherein said inserting comprises updating the value of the tail pointer to indicate that the inserted node is the last node in the ordered list of nodes.

4. The method of claim 3,
wherein said updating the value of the tail pointer to indicate that the inserted node is the last node in the ordered list of nodes is performed within a hardware transaction; and
wherein said inserting further comprises:
    prior to updating the value of the tail pointer to indicate that the inserted node is the last node in the ordered list of nodes within the hardware transaction, updating the value of the tail pointer to a pre-determined value indicating an intent to acquire the shared reader-writer lock using a non-transactional atomic operation.

5. The method of claim 1, wherein said releasing comprises:
determining whether another node succeeds the inserted node in the ordered list of nodes; and
updating the value of the tail pointer to identify another node as the last node in the ordered list of nodes or to indicate that no other node succeeds the inserted node in the ordered list of nodes, dependent on said determining.

6. The method of claim 1, wherein said inserting comprises:
   determining whether another node precedes the inserted node in the ordered list of nodes; and
   in response to determining that another node precedes the inserted node in the ordered list of nodes, writing a value to a previous-node field of the inserted node indicating that the other node precedes the inserted node in the ordered list of nodes.

7. The method of claim 1, wherein said inserting further comprises:
   initializing, using one or more non-transactional write operations, one or more of: a state field value for the inserted node, a spin field value for the inserted node, or a next-node field value for the inserted node;
   wherein the state field value indicates whether the given thread has acquired or desires to acquire the shared reader-writer lock in a read-only mode or in a write mode;
   wherein the next-node field value indicates which, if any, node succeeds the inserted node in the ordered list of nodes; and
   wherein the spin field value indicates whether the given thread must wait to acquire the shared reader-writer lock.

8. The method of claim 7, wherein at least one of said inserting or said releasing comprises reading the spin field value for the inserted node using one or more non-transactional read operations or resetting a spin field value for a node that succeeds the inserted node using a non-transactional write operation.

9. The method of claim 1, wherein said releasing comprises:
   determining whether another node succeeds the inserted node in the ordered list of nodes; and
   in response to determining no other node succeeds the inserted node in the ordered list of nodes:
      determining whether the value of the tail pointer indicates the inserted node; and
      in response to determining that the value of the tail pointer indicates the inserted node, setting the value of the tail pointer to a null value;
   wherein said determining whether the value of the tail pointer indicates the inserted node and said setting the value of the tail pointer to a null value are performed non-transactionally using a compare-and-swap type operation.

10. A system, comprising:
    one or more processor cores; and
    a memory coupled to the one or more processor cores and storing program instructions that when executed on the one or more processor cores cause the one or more processor cores to perform:
       beginning execution of a multithreaded application that comprises one or more requests to acquire a shared reader-writer lock, wherein the shared reader-writer lock comprises a tail pointer and an ordered list of zero or more nodes, wherein the shared reader-writer lock controls access to a critical section of code or a shared resource by concurrently executing threads of the application;
       a given thread of the application inserting a node in the ordered list of nodes, wherein each node in the ordered list of nodes is owned by a respective thread that holds the shared reader-writer lock or that desires access to the critical section of code or shared resource in a read-only mode or in a write mode, and wherein only one thread can hold the shared reader-writer lock in a write mode at a time;
       subsequent to said inserting, the given thread acquiring the shared reader-writer lock in a read-only mode or in a write mode; and
       subsequent to said acquiring, the given thread releasing the shared reader-writer lock, wherein said releasing comprises removing the inserted node from the ordered list of nodes;
    wherein at least one of said inserting or said releasing comprises updating a value of the tail pointer within a hardware transaction or modifying a field of at least one node in the ordered list of nodes within a hardware transaction.

11. The system of claim 10, wherein when executed on the one or more processor cores, the program instructions cause the one or more processor cores to perform:
    subsequent to said removing the inserted node, freeing memory that was allocated to the inserted node.

12. The system of claim 10, wherein said inserting comprises updating the value of the tail pointer to indicate that the inserted node is the last node in the ordered list of nodes.

13. The system of claim 12,
    wherein said updating the value of the tail pointer to indicate that the inserted node is the last node in the ordered list of nodes is performed within a hardware transaction; and
    wherein said inserting further comprises:
       prior to updating the value of the tail pointer to indicate that the inserted node is the last node in the ordered list of nodes within the hardware transaction, updating the value of the tail pointer to a pre-determined value indicating an intent to acquire the shared reader-writer lock using a non-transactional atomic operation.

14. The system of claim 10, wherein said releasing comprises:
    determining whether another node succeeds the inserted node in the ordered list of nodes; and
    updating the value of the tail pointer to identify another node as the last node in the ordered list of nodes or to indicate that no other node succeeds the inserted node in the ordered list of nodes, dependent on said determining.

15. The system of claim 10, wherein said inserting further comprises:
    initializing, using one or more non-transactional write operations, one or more of: a state field value for the inserted node, a spin field value for the inserted node, or a next-node field value for the inserted node;
    wherein the state field value indicates whether the given thread has acquired or desires to acquire the shared reader-writer lock in a read-only mode or in a write mode;
    wherein the next-node field value indicates which, if any, node succeeds the inserted node in the ordered list of nodes; and
    wherein the spin field value indicates whether the given thread must wait to acquire the shared reader-writer lock.

16. A non-transitory, computer-readable storage medium storing program instructions that when executed on one or more computers cause the one or more computers to perform:
    beginning execution of a multithreaded application that comprises one or more requests to acquire a shared reader-writer lock, wherein the shared reader-writer lock comprises a tail pointer and an ordered list of zero or more nodes, wherein the shared reader-writer lock controls access to a critical section of code or a shared resource by concurrently executing threads of the application;

a given thread of the application inserting a node in the ordered list of nodes, wherein each node in the ordered list of nodes is owned by a respective thread that holds the shared reader-writer lock or that desires access to the critical section of code or shared resource in a read-only mode or in a write mode, and wherein only one thread can hold the shared reader-writer lock in a write mode at a time;

subsequent to said inserting, the given thread acquiring the shared reader-writer lock in a read-only mode or in a write mode; and subsequent to said acquiring, the given thread releasing the shared reader-writer lock, wherein said releasing comprises removing the inserted node from the ordered list of nodes;

wherein at least one of said inserting or said releasing comprises updating a value of the tail pointer within a hardware transaction or modifying a field of at least one node in the ordered list of nodes within a hardware transaction.

17. The non-transitory, computer-readable storage medium of claim 16, wherein when executed on the one or more computers, the program instructions cause the one or more computers to perform:

subsequent to said removing the inserted node, freeing memory that was allocated to the inserted node.

18. The non-transitory, computer-readable storage medium of claim 16, wherein said inserting comprises updating the value of the tail pointer to indicate that the inserted node is the last node in the ordered list of nodes.

19. The non-transitory, computer-readable storage medium of claim 18, wherein said updating the value of the tail pointer to indicate that the inserted node is the last node in the ordered list of nodes is performed within a hardware transaction; and wherein said inserting further comprises:

prior to updating the value of the tail pointer to indicate that the inserted node is the last node in the ordered list of nodes within the hardware transaction, updating the value of the tail pointer to a pre-determined value indicating an intent to acquire the shared reader-writer lock using a non-transactional atomic operation.

20. The non-transitory, computer-readable storage medium of claim 16, wherein said releasing comprises:

determining whether another node succeeds the inserted node in the ordered list of nodes; and updating the value of the tail pointer to identify another node as the last node in the ordered list of nodes or to indicate that no other node succeeds the inserted node in the ordered list of nodes, dependent on said determining.

* * * * *